United States Patent
Ito et al.

(10) Patent No.: US 10,133,585 B2
(45) Date of Patent: Nov. 20, 2018

(54) INFORMATION PROCESSING APPARATUS INCLUDING TAGS FOR CONTROLLING OPERATION MODES

(71) Applicant: SONY CORPORATION, Tokyo (JP)

(72) Inventors: Ryogo Ito, Tokyo (JP); Shunsuke Katsumata, Kanagawa (JP); Kazuma Akamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/311,543

(22) PCT Filed: Mar. 17, 2015

(86) PCT No.: PCT/JP2015/057965
§ 371 (c)(1),
(2) Date: Nov. 16, 2016

(87) PCT Pub. No.: WO2015/186405
PCT Pub. Date: Dec. 10, 2015

(65) Prior Publication Data
US 2017/0109181 A1 Apr. 20, 2017

(30) Foreign Application Priority Data

Jun. 2, 2014 (JP) .................. 2014-114068

(51) Int. Cl.
*G06F 9/445* (2018.01)
*G06F 13/10* (2006.01)

(52) U.S. Cl.
CPC ........ *G06F 9/44505* (2013.01); *G06F 13/102* (2013.01)

(58) Field of Classification Search
CPC .................................. G06F 9/44505
See application file for complete search history.

(56) References Cited

U.S. PATENT DOCUMENTS

| | | | | |
|---|---|---|---|---|
| 2005/0140794 A1* | 6/2005 | Yahagi | ............... | H04N 1/00236 348/211.2 |
| 2007/0205874 A1* | 9/2007 | Tokkonen | .............. | B42D 1/007 340/10.41 |
| 2008/0006696 A1* | 1/2008 | Piersol | ............. | G06K 19/07381 235/451 |
| 2008/0041930 A1* | 2/2008 | Smith | ................. | G06F 9/44505 235/375 |
| 2015/0102910 A1* | 4/2015 | Han | ................... | G06K 7/10009 340/10.1 |

FOREIGN PATENT DOCUMENTS

| | | | | |
|---|---|---|---|---|
| EP | 1809056 A2 * | 7/2007 | ........ | H04W 52/0235 |
| JP | 2008-271151 A | 11/2008 | | |
| JP | 2009-055505 A | 3/2009 | | |
| JP | 2010-074239 A | 4/2010 | | |
| JP | 2013-157737 A | 8/2013 | | |
| JP | 2013-257687 A | 12/2013 | | |
| JP | 2014-011495 A | 1/2014 | | |
| WO | 2014/002325 A1 | 1/2014 | | |

* cited by examiner

*Primary Examiner* — Glenn A. Auve
(74) *Attorney, Agent, or Firm* — Chip Law Group

(57) ABSTRACT

Provided is an information processing apparatus including a decision unit configured to decide an operation mode defining an operation of a target apparatus on the basis of tag information acquired from a tag capable of communicating with an external device, the target apparatus being an apparatus corresponding to the tag information.

18 Claims, 10 Drawing Sheets

INFORMATION PROCESSING APPARATUS INCLUDING TAGS FOR CONTROLLING OPERATION MODES

CROSS REFERENCE TO RELATED APPLICATIONS

This application is a U.S. National Phase of International Patent Application No. PCT/JP2015/057965 filed on Mar. 17, 2015, which claims priority benefit of Japanese Patent Application No. JP 2014-114068 filed in the Japan Patent Office on Jun. 2, 2014. The above-referenced applications is hereby incorporated herein by reference in its entirety.

TECHNICAL FIELD

The present disclosure relates to an information processing apparatus, an information processing method, and a program.

BACKGROUND ART

Technology for switching modes (referred to hereinafter as "operation modes") in which an apparatus operates according to a user operation using an operating device such as a button has been developed. As technology for switching operation modes of an apparatus according to a user operation, for example, the technology described in the following Patent Literature 1 may be exemplified.

CITATION LIST

Patent Literature

Patent Literature 1: JP 2010-74239A

SUMMARY OF INVENTION

Technical Problem

By switching operation modes of an apparatus according to a user operation using an operating device, a user may cause the apparatus to perform a desired operation according to the user operation. However, when an initial operation mode when the power of the apparatus is turned on is not a desired operation mode of the user, for example, the user may not cause the apparatus to perform a desired operation unless the user newly performs the user operation using the operating device. Therefore, it may not be possible to improve user convenience even using technology for switching operation modes according to a user operation using the operating device.

The present disclosure provides a novel and improved information processing apparatus, information processing method and program to improve user convenience.

Solution to Problem

According to the present disclosure, there is provided an information processing apparatus including a decision unit configured to decide an operation mode defining an operation of a target apparatus on the basis of tag information acquired from a tag capable of communicating with an external device, the target apparatus being an apparatus corresponding to the tag information.

According to the present disclosure, there is provided an information processing apparatus including a plurality of tags capable of communicating with an external device, and a decision unit configured to decide an operation mode defining an operation on the basis of communication of the tags.

According to the present disclosure, there is provided an information processing method performed by an information processing apparatus, the method including deciding an operation mode defining an operation of a target apparatus on the basis of tag information acquired from a tag capable of communicating with an external device, the target apparatus being an apparatus corresponding to the tag information.

According to the present disclosure, there is provided an information processing method performed by an information processing apparatus including a plurality of tags, the method including deciding an operation mode defining an operation on the basis of communication of a tag capable of communicating with an external device.

According to the present disclosure, there is provided a program for enabling a computer to execute deciding an operation mode defining an operation of a target apparatus on the basis of tag information acquired from a tag capable of communicating with an external device, the target apparatus being an apparatus corresponding to the tag information.

According to the present disclosure, there is provided a program for enabling a computer including a plurality of tags to execute deciding an operation mode defining an operation on the basis of communication of a tag capable of communicating with an external device.

Advantageous Effects of Invention

According to the present disclosure, it may be possible to improve user convenience.

Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
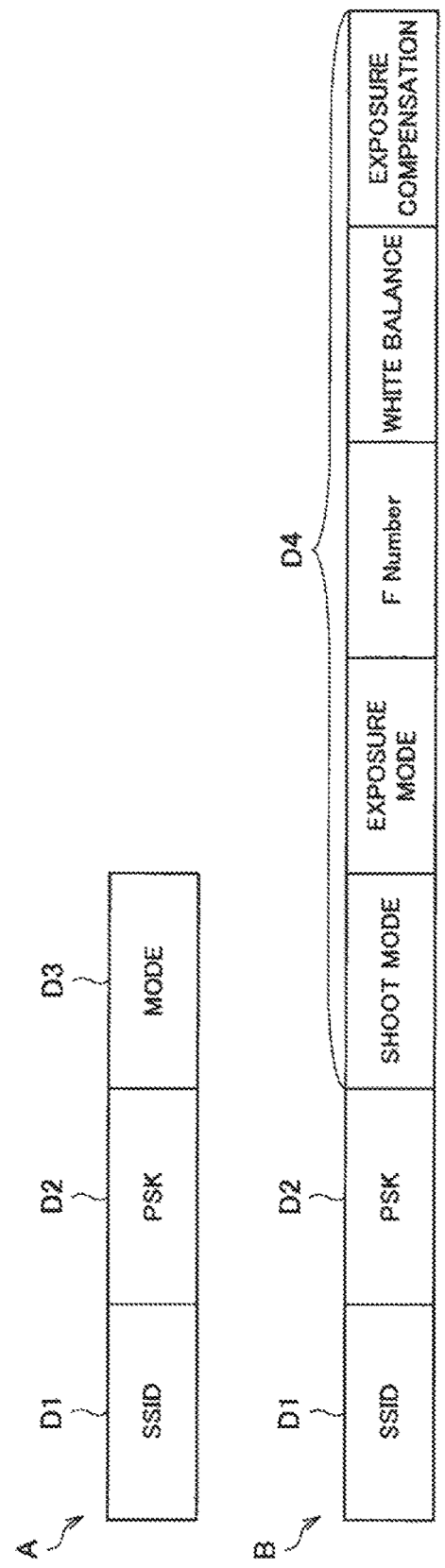
FIG. 1 is an explanatory diagram of an example of tag information according to the present embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, a description will be given in the following order.
1. Information processing method according to present embodiment
2. Information processing apparatus according to present embodiment
3. Programs according to present embodiment.
(Image Processing Method According to Present Embodiment)

An information processing method according to the present embodiment will be described first prior to description of a configuration of an information processing apparatus according to the present embodiment. Hereinafter, the information processing method according to the present embodiment will be described with examples in which the information processing apparatus according to the present embodiment performs processes of the information processing method according to the present embodiment.

As described above, it may not be possible to improve user convenience even using technology for switching operation modes according to a user operation using an operating device.

Therefore, the information processing apparatus according to the present embodiment decides an operation mode on the basis of communication of a tag through which communication with an external device is possible, or tag information acquired from the tag through which communicate with an external device is possible (decision process).

Here, an operation mode according to the present embodiment is, for example, an index for defining an operation of an apparatus. As an operation mode according to the present embodiment, for example, an arbitrary operation mode for performing an operation executable by an apparatus, such as a shooting mode for performing a shooting operation, a transfer mode for transferring data, a replay mode for replaying content data and the like, or a preset mode in which predetermined settings are set, may be exemplified.

In addition, as communication between the tag according to the present embodiment and an external device, for example, near field communication (NFC) using a magnetic field (carrier) of a predetermined frequency such as 13.56 [MHz] may be exemplified.

When communication between the tag according to the present embodiment and the external device is NFC, the tag according to the present embodiment is driven by obtaining power from carriers transmitted from the external device having a reader/writer function of actively transmitting carriers and communicates with the external device according to load modulation, for example. Accordingly, when communication between the tag according to the present embodiment and the external device is NFC, it is advantageous to reduce the size and cost of the tag according to the present embodiment because the tag according to the present embodiment may not have an additional power supply. Furthermore, the tag according to the present embodiment may, of course, include a power supply and a carrier transmission circuit and have the reader/writer function.

In addition, when communication between the tag according to the present embodiment and the external device is NFC, a user may cause communication between the tag according to the present embodiment and the external device to be performed when the user performs a touch operation (referred to hereinafter as simply "touch") using the external device. Here, the touch operation according to the present embodiment refers to an operation of moving a device (corresponding to the external device) such that a distance between the device and another device (corresponding to the tag according to the present embodiment) is within a distance in which communication by NFC may be performed. Accordingly, when communication between the tag according to the present embodiment and the external device is NFC, communication between the tag according to the present embodiment and the external device is performed by a simple operation such as a touch operation, and thus user convenience may be improved.

Furthermore, communication between the tag according to the present embodiment and the external device is not limited to NFC and may be an arbitrary communication scheme such as infrared communication.

Hereinafter, a case in which communication between the tag according to the present embodiment and the external device is NFC is exemplified. In addition, a case in which the tag according to the present invention is an integrated circuit (IC) tag corresponding to NFC, such as a radio frequency identifier (RFID) tag, is exemplified hereinafter. In the following description, there are cases in which the tag according to the present embodiment is referred to as an "IC tag."

Tag information according to the present embodiment is data stored in the IC tag.

As the tag information according to the present embodiment, for example, information about an operation mode may be exemplified. As the information about an operation mode according to the present embodiment, for example, information indicating an operation mode and preset information indicating predetermined settings may be exemplified. Here, the content of settings indicated by the preset information may be fixed or updatable.

The tag information according to the present embodiment may further include information about communication with an apparatus corresponding to the tag information. Hereinafter, the device corresponding to the tag information is referred to as a "target apparatus." The target apparatus according to the present embodiment corresponds to an apparatus of an object for which the information processing apparatus according to the present embodiment determines an operation mode on the basis of the tag information.

FIG. 1 is an explanatory diagram of an example of the tag information according to the present embodiment. A illustrated in FIG. 1 denotes a first example of the tag information according to the present embodiment and B illustrated in FIG. 1 denotes a second example of the tag information according to the present embodiment.

The tag information according to the first example represented by A of FIG. 1 includes a "service set identifier (SSID)" (D1 illustrated in FIG. 1) serving as an identifier when communication is performed, a "pre-shared key (PSK)" (D2 illustrated in FIG. 1) serving as a password when communication is performed, and "MODE" (D3 illustrated in FIG. 1) that is information indicating an operation mode.

"SSID" and "PSK" in A of FIG. 1 correspond to information about communication with a target apparatus. While FIG. 1 illustrates data related to communication conforming to IEEE 802.11 standards as information about communication with the target apparatus, information about communication with the target apparatus according to the present embodiment is, of course, not limited to the example illustrated in FIG. 1.

As values (content) indicated by "MODE," for example, "SHOOTING" that indicates a shooting mode, "TRANSFER" that indicates a transfer mode, and "REPLAY" that indicates a replay mode may be exemplified.

The tag information according to the second example represented by B of FIG. 1 includes a "service set identifier (SSID)" (D1 illustrated in FIG. 1), a "pre-shared key (PSK)" (D2 illustrated in FIG. 1) and preset information (D4 illustrated in FIG. 1).

B of FIG. 1 illustrates an example in which "SHOOT MODE" indicating settings of shooting, "EXPOSURE MODE" indicating settings of exposure, "F Number" indicating settings of an F value, "WHITE BALANCE" indicating settings of white balance and "EXPOSURE COMPENSATION" indicating settings of EV shift are included as the preset information.

As values (content) indicated by the preset information illustrated in D4 of FIG. 1, for example, the following values may be exemplified.
 "SHOOT MODE": "still" indicating shooting of a still image, "movie" indicating shooting of a moving image, etc.
 "EXPOSURE MODE": "Auto" and "Program Auto" indicating automatic exposure, "Manual" indicating manual exposure, etc.
 "F Number": 1.8, 2, 2.2, . . . , 9.6, etc.
 "WHITE BALANCE": "Auto" indicating automatic white balance, "Cloudy" corresponding to shade or fade, "Daylight" corresponding to daytime, etc.
 "EXPOSURE COMPENSATION": −3.0, . . . , +3.0, etc.

The preset information according to the present embodiment is not limited to data indicating settings related to shooting as illustrated in D3 of FIG. 1. For example, as the preset information according to the present embodiment, arbitrary data indicating predetermined settings, such as settings related to replay of content data and settings related to transfer of data, may be exemplified.

As the tag information according to the present embodiment, for example, the examples represented by A of FIG. 1 and B of FIG. 1 may be exemplified.

The tag information according to the present embodiment is not limited to the examples illustrated in FIG. 1. For example, when the information processing apparatus according to the present embodiment stores information about communication with the target apparatus in a recording medium such as a storage unit (which will be described later) or may acquire the information about communication with the target apparatus from an external device such as a server, the tag information according to the present embodiment may not include the information about communication with the target apparatus.

Figure 2:
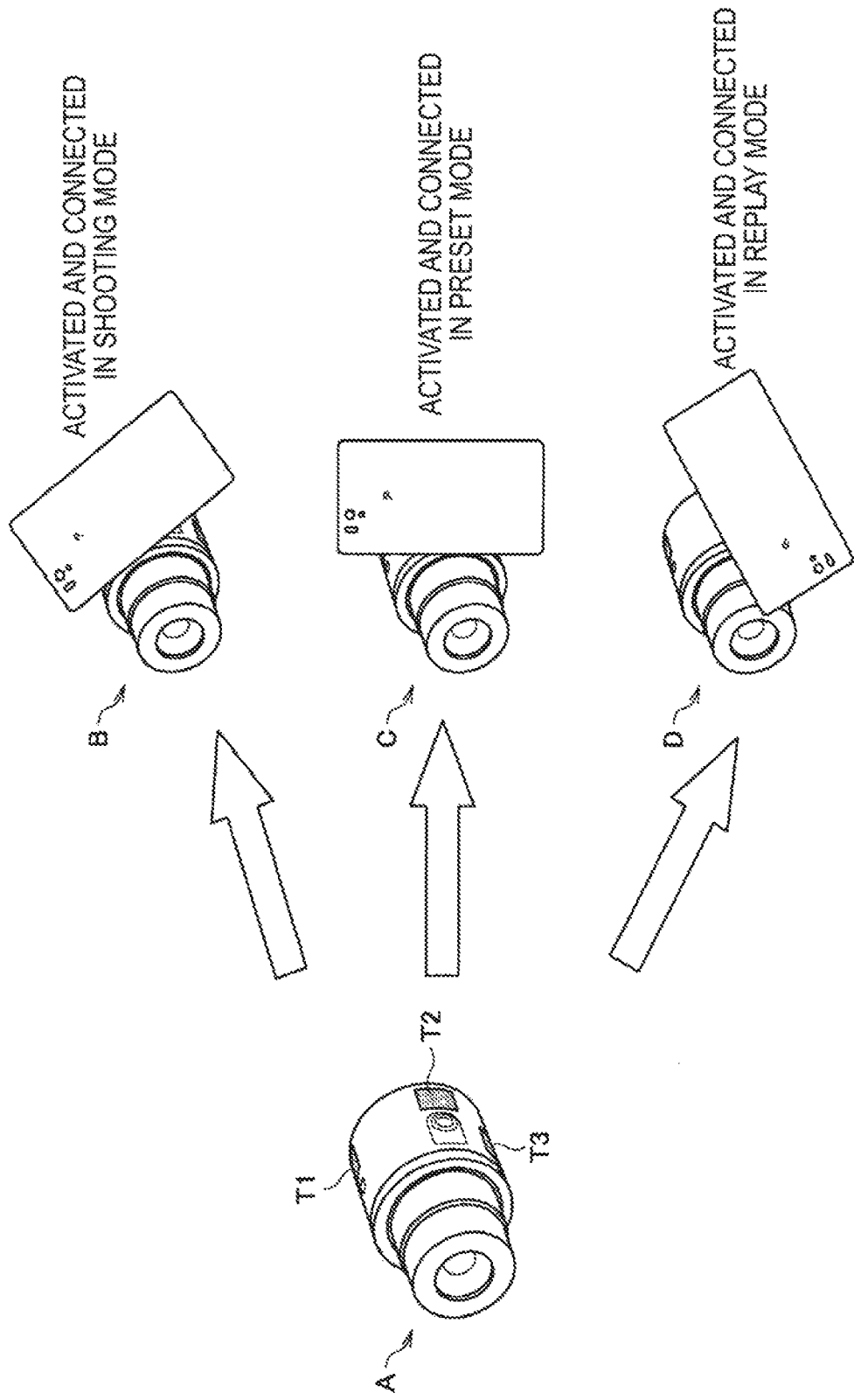
FIG. 2 is an explanatory diagram of an example of an apparatus operation implemented using an information processing method according to the present embodiment.

FIG. 2 is an explanatory diagram of an example of an operation of an apparatus, which is implemented using the information processing method according to the present embodiment.

FIG. 2 illustrates an example in which IC tags T1, T2 and T3 are provided to a photographing apparatus (A illustrated in FIG. 2). The IC tags T1, T2 and T3 are connected to, for example, a processor or the like included in the photographing apparatus and serve as components of the photographing apparatus. In addition, the IC tags T1, T2 and T3 may be, for example, external devices of the photographing apparatus, which are provided to the photographing apparatus by being attached to the photographing apparatus.

In addition, FIG. 2 illustrates an example in which a user performs a touch operation for each of the IC tags T1, T2 and T3 attached to the photographing apparatus using a communication device such as a smart phone (B of FIG. 2, C of FIG. 2 and D of FIG. 2).

Here, the photographing apparatus or the communication device serves as the information processing apparatus according to the present embodiment, which performs processes of the information processing method according to the present embodiment in FIG. 2. Processing of the information processing method according to the present embodiment, which corresponds to a case in which the photographing apparatus serves as the information processing apparatus according to the present embodiment, and processing of the information processing method according to the present embodiment, which corresponds to a case in which the communication device serves as the information processing apparatus according to the present embodiment, will be described later.

Hereinafter, a case in which tag information to be described below is stored in each of the IC tags T1, T2 and T3 is exemplified. While not illustrated in FIG. 2, a tag according to the present embodiment may represent a character, a figure, a picture or a combination thereof for visually notifying a user of an operation mode corresponding thereto.
 IC tag T1: this stores tag information represented by A in FIG. 1, and "SHOOTING" indicating the shooting mode as information representing an operation mode is included in the tag information.
 IC tag T2: this stores tag information represented by B in FIG. 1.
 IC tag T3: this stores tag information represented by A in FIG. 1, and "REPLAY" indicating the replay mode as information representing an operation mode is included in the tag information.

As illustrated in B of FIG. 2, when the user touches the IC tag T1, for example, the shooting mode is determined as an operation mode on the basis of communication of the IC tag T1 or tag information acquired from the IC tag T1 through communication.

The photographing apparatus performs a process corresponding to the determined shooting mode and consequently operates in the shooting mode. Here, the photographing apparatus performs the process corresponding to the shooting mode on the basis of, for example, an operation request (which will be described later) corresponding to the shooting mode, which is transmitted from the communication device. In addition, the photographing apparatus specifies the process corresponding to the shooting mode with reference to, for example, a table (or a database; the same hereinafter) in which operation modes and processes are correlated and performs the specified process.

In addition, the photographing apparatus may perform a process corresponding to a processing command transmitted from the communication device on the basis of the processing command. That is, the communication device in the example illustrated in FIG. 2 may serve as, for example, a remote controller that controls processing of the photographing apparatus through communication.

As illustrated in C of FIG. 2, when the user touches the IC tag T2, for example, the shooting mode is determined as a preset mode on the basis of communication of the IC tag T2 or tag information acquired from the IC tag T2 through communication.

Then, the photographing apparatus performs a process corresponding to the determined preset mode and, as a result, predetermined settings indicated by preset information are set in the photographing apparatus. The photographing apparatus operates according to the settings. Here, the photographing apparatus performs the process corresponding to the preset mode on the basis of, for example, an operation request corresponding to the preset mode, which is transmitted from the communication device. Furthermore, the photographing apparatus performs the process corresponding to the preset mode with reference to, for example, preset information corresponding to the IC tag T2, which is stored in a recording medium or the like.

As shown in C of FIG. 2, when the user touches the IC tag T3, for example, the replay mode is determined as an operation mode on the basis of communication of the IC tag T3 or tag information acquired from the IC tag 13 through communication.

Then, the photographing apparatus performs a process corresponding to the determined replay mode and consequently operates in the replay mode. Here, the photographing apparatus performs the process corresponding to the replay mode on the basis of, for example, an operation request corresponding to the shooting mode, which is transmitted from the communication device. Furthermore, the photographing apparatus specifies the process corresponding to the replay mode with reference to, for example, the table in which operation modes and processes are correlated and performs the specified process.

When the information processing method according to the present embodiment is used, an operation mode is determined on the basis of communication of an IC tag or tag information acquired from the IC tag.

Accordingly, if the user performs a simple operation such as a touch operation on an IC tag corresponding to a desired operation mode, the user may operate an apparatus such as the photographing apparatus illustrated in FIG. 2 according to the determined operation mode.

Furthermore, when the information processing method according to the present embodiment is used, the user may directly operate the apparatus in a desired operation mode according to a touch operation. Accordingly, when the information processing method according to the present embodiment is used, there is an even higher possibility that a waiting time until the apparatus operates in the desired operation mode will be reduced than in a case in which an operation mode is switched to a desired operation mode according to a user operation using an operating device.

In addition, when the information processing method according to the present embodiment is used, the user may operate the apparatus in the preset mode according to a touch operation and thus allow the apparatus to perform predetermined settings corresponding to the preset mode.

Here, the predetermined settings (content of settings indicated by the preset information) may be updated, for example. By updating the content of settings indicated by the preset information, the user may operate the apparatus by allowing the apparatus to perform arbitrary settings according to a touch operation. In addition, because the content of the settings indicated by the preset information is set to content of settings related to a function frequently used by the user, the user may easily use the frequently used function in desired settings.

Accordingly, the information processing apparatus according to the present embodiment may perform a decision process as a process of the information processing method according to the present embodiment, thereby improving user convenience.

Processing for operating an apparatus according to an operation mode decided by the decision process according to the present embodiment may be performed by the information processing apparatus according to the present embodiment as a process of the information processing method according to the present embodiment or performed by an external device of the information processing apparatus according to the present embodiment. Hereinafter, a case in which the information processing apparatus according to the present embodiment performs processing for operating the apparatus (an execution process or an operation control process described below) is mainly exemplified as some processes of the information processing method according to the present embodiment.

Hereinafter, the processes of the information processing method according to the present embodiment will be described in more detail and an example of the configuration of the information processing apparatus according to the present embodiment will be described simultaneously.
(Information Processing Apparatus According to Present Embodiment)
[1] Information Processing Apparatus According to First Embodiment First of all, an information processing apparatus that includes a plurality of IC tags and determines its own operation mode (the information processing apparatus according to the present embodiment; the same hereinafter) will be described as the first embodiment.

The information processing apparatus according to the first embodiment corresponds to the photographing apparatus in the example illustrated in FIG. 2. The information processing apparatus according to the first embodiment is not limited to the photographing apparatus illustrated in FIG. 2. There are cases below in which the information processing apparatus according to the first embodiment is represented as "information processing apparatus 100."
[1-1] Processing in Information Processing Apparatus According to First Embodiment The information processing apparatus 100 performs, (1) a decision process and (2) an execution process, which will be described below, for example, as processes of the information processing method according to the present embodiment. As described above, the information processing apparatus 100 may not perform the process of (2) (execution process) which will be described below.
(1) Decision Process The information processing apparatus 100 decides its own operation mode on the basis of communication of an IC tag.
(1-1) First Example of Decision Process The information processing apparatus 100 decides an operation mode on the basis of tag information acquired from an IC tag performing communication.

In the information processing apparatus 100, for example, a processor serving as a decision unit (which will be described later) that performs the decision process according to the present embodiment and a plurality of IC tags are connected. In the information processing apparatus 100, for example, an IC tag that has communicated with an external device delivers tag information to the processor such that the decision unit (which will be described later) acquires the tag information.

Here, in the information processing apparatus 100, for example, the IC tag communicating with the external device sends a signal representing that communication is performed to the processor such that the decision unit (which will be described later) acquires the tag information by reading the tag information from the IC tag in response to the signal. The decision unit (which will be described later) reads the tag information from the IC tag by sending, to the IC tag, a transmission request (referred to hereinafter as a "tag information transmission request) including a transmission command for instructing that the tag information be transmitted, for example. Furthermore, the decision unit (which will be described later) may acquire the tag information, for example, by actively sending the tag information to the processor by the IC tag communicating with the external device.

In the information processing apparatus 100, the decision unit (which will be described later) decides an operation mode on the basis of the acquired tag information.

As described above, the tag information includes information about an operation mode. The information processing apparatus 100 decides the operation mode corresponding to the acquired information about the operation mode.

For example, when the information about the operation mode is information indicating the operation mode represented by D3 in FIG. 1, the information processing apparatus 100 decides the operation mode indicated by the information indicating the operation mode as its own operation mode.

In addition, when the information about the operation mode is the preset information represented by D4 in FIG. 1, for example, the information processing apparatus 100 decides the preset mode as its own operation mode.

The information processing apparatus 100 decides an operation mode, for example, whenever tag information is acquired. That is, the information processing apparatus 100 decides an operation mode, for example, whenever any of a plurality of IC tags performs communication. When the information processing apparatus 100 decides an operation mode whenever tag information is acquired, operation modes are switched by a touch operation of the user, for example, according to the process of (2) (execution process) which will be described below.

(1-2) Second Example of Decision Process

The information processing apparatus 100 decides an operation mode previously correlated with an IC tag performing communication as an operation mode.

In the information processing apparatus 100, for example, the processor serving as the decision unit (which will be described later) that performs a decision process according to the present embodiment is coupled to a plurality of IC tags. In the information processing apparatus 100, for example, the decision unit (which will be described later) determines an IC tag performing communication.

Here, the decision unit (which will be described later) determines the IC tag performing communication, for example, on the basis of potential change in a terminal coupled to the IC tag and a signal representing that communication is performed, which is sent from the IC tag. A method of determining the IC tag performing communication is not limited to the aforementioned method, and the IC tag performing communication may be determined by an arbitrary method.

In the information processing apparatus 100, for example, the decision unit (which will be described later) specifies an operation mode previously correlated with the determined IC tag and decides the operation mode as an operation mode. The decision unit (which will be described later) specifies the operation mode previously correlated with the determined IC tag with reference to, for example, a table in which IC tags and operation modes are stored in correlation.

The information processing apparatus 100 decides an operation mode, for example, whenever an IC tag performing communication is determined. That is, the information processing apparatus 100 decides an operation mode, for example, whenever any of a plurality of IC tags performs communication. When the information processing apparatus 100 decides the operation mode whenever the IC tag performing communication is determined, operation modes are switched by a touch operation of the user, for example, according to the process of (2) (execution process) which will be described below.

(1-3) Third Example of Decision Process

The information processing apparatus 100 decides an operation mode indicated by an operation request sent from an external device as an operation mode. The external device determines an operation mode on the basis of tag information acquired from an IC tag through communication and transmits an operation request for operation in the determined operation mode. Furthermore, the information processing apparatus 100 acquires the operation request sent from the external device when the operation request is received through a communication unit (which will be described later) included in the information processing apparatus 100 or an external communication device connected to the information processing apparatus 100.

When the information processing apparatus 100 performs the decision process according to the third example, for example, IC tags may be included in the information processing apparatus 100 by being connected to the processor or the like inside of the information processing apparatus 100 and may be attached to the information processing apparatus 100 without being connected to the processor or the like inside of the information processing apparatus 100.

Here, as the external device that sends the operation request, an information processing apparatus according to a second embodiment, which will be described below, may be exemplified. An example of processing in the external device according to the decision process of the third example will be described in description of the information processing apparatus according to the second embodiment.

In addition, the operation request according to the present embodiment includes, for example, information about an operation mode. Furthermore, the operation request according to the present embodiment may further include, for example, an operation command for instructing that a process corresponding to the operation mode be performed and identification information indicating the apparatus that transmits the operation request. As the identification information according to the present embodiment, for example, the ID, media access control (MAC) address and the like of the apparatus may be exemplified.

Moreover, the operation request according to the present embodiment may include, for example, data for calling an application programming interface (API) such as a web API (e.g., an API key or the like). When the data for calling the API is included in the operation request, transmission of the operation request corresponds to issuance of the API, for example.

The information processing apparatus 100 decides an operation mode, for example, whenever an operation request is acquired from an external device. Here, the external device sends the operation request on the basis of tag information acquired from an IC tag through communication. That is, the information processing apparatus 100 decides an operation mode, for example, whenever any of a plurality of IC tags performs communication. When the information processing apparatus 100 decides an operation mode whenever an operation request is acquired from the external device, operation modes are switched by a touch operation of the user, for example, according to the process of (2) (execution process) which will be described below.

Furthermore, the information processing apparatus 100 may determine an external device that has sent an operation request and decide an operation mode for each determined external device. The information processing apparatus 100 determines an external device that has transmitted a relevant operation request, for example, on the basis of identification information included in the operation request.

When the information processing apparatus 100 decides an operation mode for each external device that has transmitted an operation request, the information processing apparatus 100 may perform a process corresponding to an operation mode corresponding to each external device, for example, according to the process of (2) (execution process) which will be described below. Accordingly, when the information processing apparatus 100 decides an operation mode for each external device that has transmitted an operation request, the information processing apparatus 100 may operate in an operation mode desired by each user, for example, even when a plurality of users performs touch operations.

(1-4) Fourth Example of Decision Process

The information processing apparatus 100 may perform a process corresponding to a combination of the decision process according to the first example represented in (1-1) to the decision process according to the third example represented in (1-3), such as "the decision process according to the first example represented in (1-1) and the decision process according to the third example represented in (1-3)" or "the decision process according to the second example represented in (1-2), and the decision process according to the third example represented in (1-3)," as a decision process.

When a process corresponding to a combination of the decision process according to the first example represented in (1-1) to the decision process according to the third example represented in (1-3) is performed as a decision process, a priority is given to each process and the information processing apparatus 100 determines an operation mode decided according to the priories of the processes as an operation mode. Priorities given to the decision process according to the first example represented in (1-1) to the decision process according to the third example represented in (1-3) may be a predetermined fixed value or a variable value that may be changed by a user operation.

(2) Execution Process

The information processing apparatus 100 performs a process corresponding to an operation mode decided by the process of (1) (decision process).

The information processing apparatus 100 specifies a process corresponding to the decided operation mode with reference to, for example, a table in which operation modes and processes are correlated and performs the specified process as a process corresponding to the operation mode. For example, when the information processing apparatus 100 decides an operation mode on the basis of an operation request sent from an external device, and the operation request includes an operation command, the information processing apparatus 100 may perform the process corresponding to the operation mode according to the operation command included in the operation request.

The information processing apparatus 100 according to the first embodiment performs, for example, the process of (1) (decision process) and the process of (2) (execution process) as processes of the information processing method according to the present embodiment.

Here, the information processing apparatus 100 decides an operation mode on the basis of communication of an IC tag in the process of (1) (decision process). In addition, the information processing apparatus 100 performs a process corresponding to the decided operation mode according to the process of (2) (execution process). Accordingly, when the user touches an IC tag that is provided to the information processing apparatus 100 and corresponds to a desired operation mode, for example, the user may cause the information processing apparatus 100 to decide the desired operation mode and to operate in the decided operation mode.

Therefore, the information processing apparatus 100 may improve user convenience by performing the process of (1) (decision process) and the process of (2) (execution process).

Processing of the information processing method according to the present embodiment is not limited to the process of (1) (decision process) and the process of (2) (execution process). For example, when a process corresponding to an operation mode decided by an external device of the information processing apparatus 100 is controlled (e.g., when an operation control process which will be described later is performed), the information processing apparatus 100 may not perform the process of (2) (execution process).

Furthermore, the process of (1) (decision process) and the process of (2) (execution process) are divisions of processing of the information processing method according to the present embodiment for convenience. Accordingly, the processing of the information processing method according to the present embodiment may recognize the process of (1) (decision process) and the process of (2) (execution process) as a single process or as two or more processes (according to an arbitrary division method).

[1-2] Detailed Examples of Processing in Information Processing Apparatus According to First Embodiment Detailed examples of processing in the information processing apparatus 100 according to the first embodiment will be exemplified.

Figure 3:
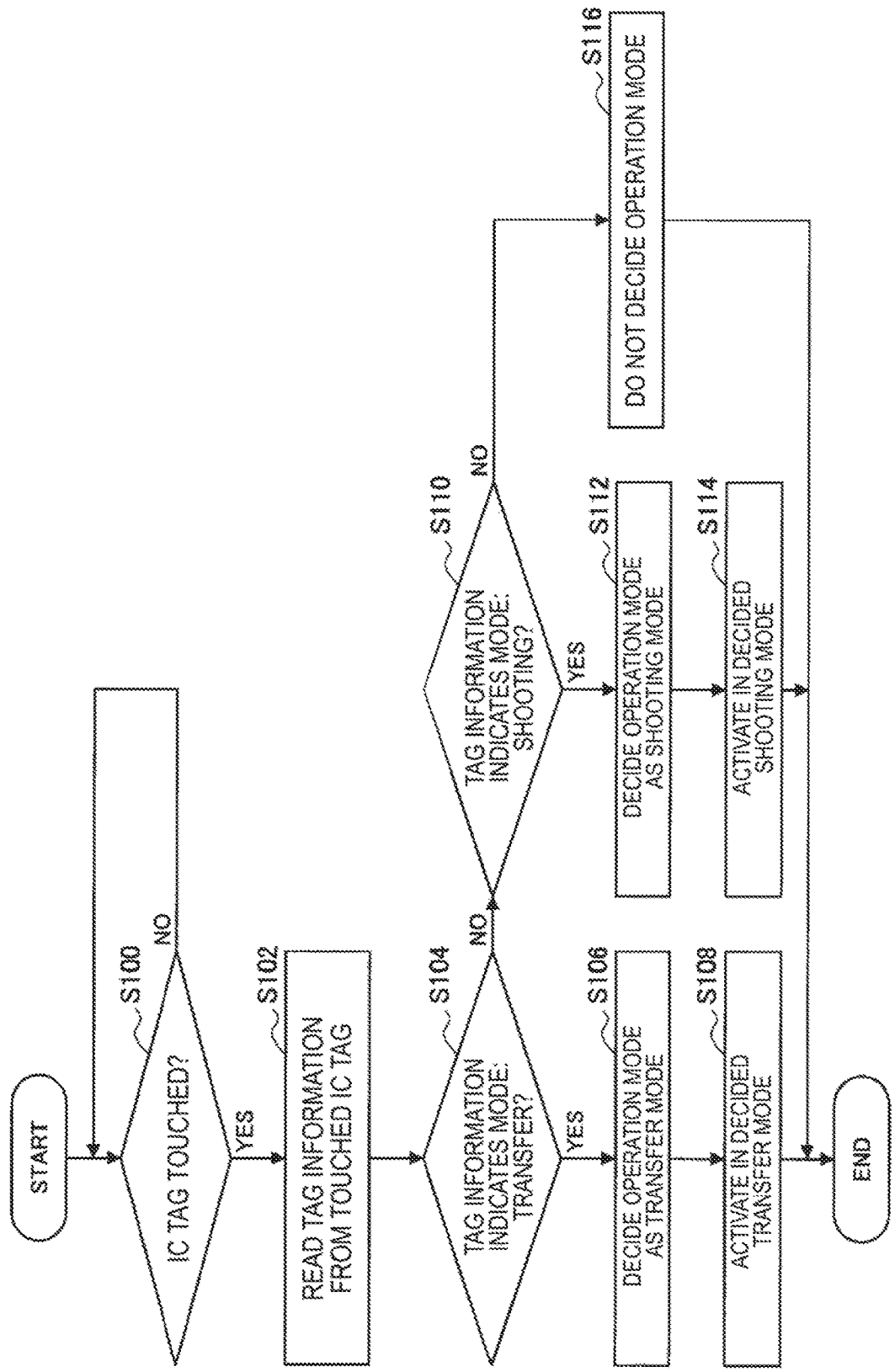
FIG. 3 is a flowchart illustrating an example of processing in an information processing apparatus according to a first embodiment.

FIG. 3 is a flowchart illustrating an example of processing in the information processing apparatus 100 according to the first embodiment.

Here, processes of steps S100 to S106, S110, S112 and S116, for example, correspond to the process of (1) (decision process) in FIG. 3. Processes of steps S108 and S114, for example, correspond to the process of (2) (execution process) in FIG. 3.

FIG. 3 illustrates an example of processing when the information processing apparatus 100 performs the decision process according to the first example described in (1-1). Furthermore, a case in which tag information has a data structure represented by A in FIG. 1 is exemplified in FIG. 3.

Moreover, FIG. 3 illustrates an example of processing when the information processing apparatus 100 operates in the transfer mode or the shooting mode. The operation mode in the information processing apparatus 100 is, of course, not limited to the transfer mode or the shooting mode illustrated in FIG. 3.

The information processing apparatus 100 determines whether a touch operation has been performed for an IC tag (S100).

The information processing apparatus 100 determines that the touch operation has been performed for the IC tag, for example, when a signal indicating execution of communication is delivered from the IC tag performing communication in response to the touch operation.

Furthermore, the information processing apparatus 100 may determine that the touch operation has been performed for the IC tag, for example, when tag information is sent from the IC tag performing communication in response to the touch operation. When the process of step S100 is performed on the basis of the sent tag information, the information processing apparatus 100 may not perform the process of step S102 which will be described later.

When it is not determined that the touch operation has been performed for the IC tag in step S100, the information processing apparatus 100 does not perform the processing until it is determined that the touch operation has been performed for the IC tag.

When it is determined that the touch operation has been performed for the IC tag in step S100, the information processing apparatus 100 reads tag information from the IC tag (i.e., IC tag performing communication) for which the touch operation has been performed (S102).

When the tag information is read in step S102, the information processing apparatus 100 decides an operation mode on the basis of the acquired tag information (S104, S106, S110, S112 and S116). Then, the information processing apparatus 100 is activated in the decided operation mode and performs a process corresponding to the decided operation mode (S108 and S114).

Here, activation in the operation mode according to the present embodiment refers to state transition, for example, from a power off state to a state in which the process corresponding to the operation mode may be performed. When the information processing apparatus 100 is in a state in which a process corresponding to one operation mode may be performed, operation modes are switched according to the processes of steps S108 and S114 such that the state in which a process corresponding to one operation mode may be performed is switched to a state in which the process corresponding to the decided operation mode may be performed in the information processing apparatus 100.

More specifically, the information processing apparatus 100 determines whether the tag information indicates the transfer mode (S104). The information processing apparatus 100 determines that the tag information indicates the transfer mode with reference to, for example, a value indicated by information representing an operation mode (e.g., D3 illustrated in FIG. 1), which is included in the tag information, when the value represents "TRANSFER."

When it is determined that the tag information indicates the transfer mode in step S104, the information processing apparatus 100 decides the transfer mode as an operation mode (S106). Then, the information processing apparatus 100 is activated in the transfer mode to perform a process corresponding to the transfer mode (S108).

When it is not determined that the tag information indicates the transfer mode in step S104, the information processing apparatus 100 determines whether the tag information indicates the shooting mode (S110). The information processing apparatus 100 determines that the tag information indicates the shooting mode with reference to, for example, the value indicated by information representing an operation mode (e.g., D3 illustrated in FIG. 1), which is included in the tag information, when the value represents "SHOOTING."

When it is determined that the tag information indicates the shooting mode in step S110, the information processing apparatus 100 decides the shooting mode as an operation mode (S112). Then, the information processing apparatus 100 is activated in the shooting mode to perform a process corresponding to the shooting mode (S114).

When it is not determined that the tag information indicates the shooting mode in step S110, the information processing apparatus 100 does not decide the operation mode (S116; exception processing).

The information processing apparatus 100 according to the first embodiment decides an operation mode on the basis of communication of an IC tag and performs a process corresponding to the decided operation mode by executing the process illustrated in FIG. 3, for example, as the processing of the information processing method according to the present embodiment.

Processing in the information processing apparatus 100 is not limited to the example illustrated in FIG. 3.

For example, although FIG. 3 illustrates an example in which the process of step S110 is performed depending on the result of the process of step S104, the information processing apparatus 100 may independently perform the process of step S104 and the process of step S110 on the basis of the acquired tag information. Accordingly, the information processing apparatus 100 may perform the process of step S104 in response to the result of the process of step S110 or perform the process of step S104 and the process of step S110 in parallel, for example.

Figure 4:
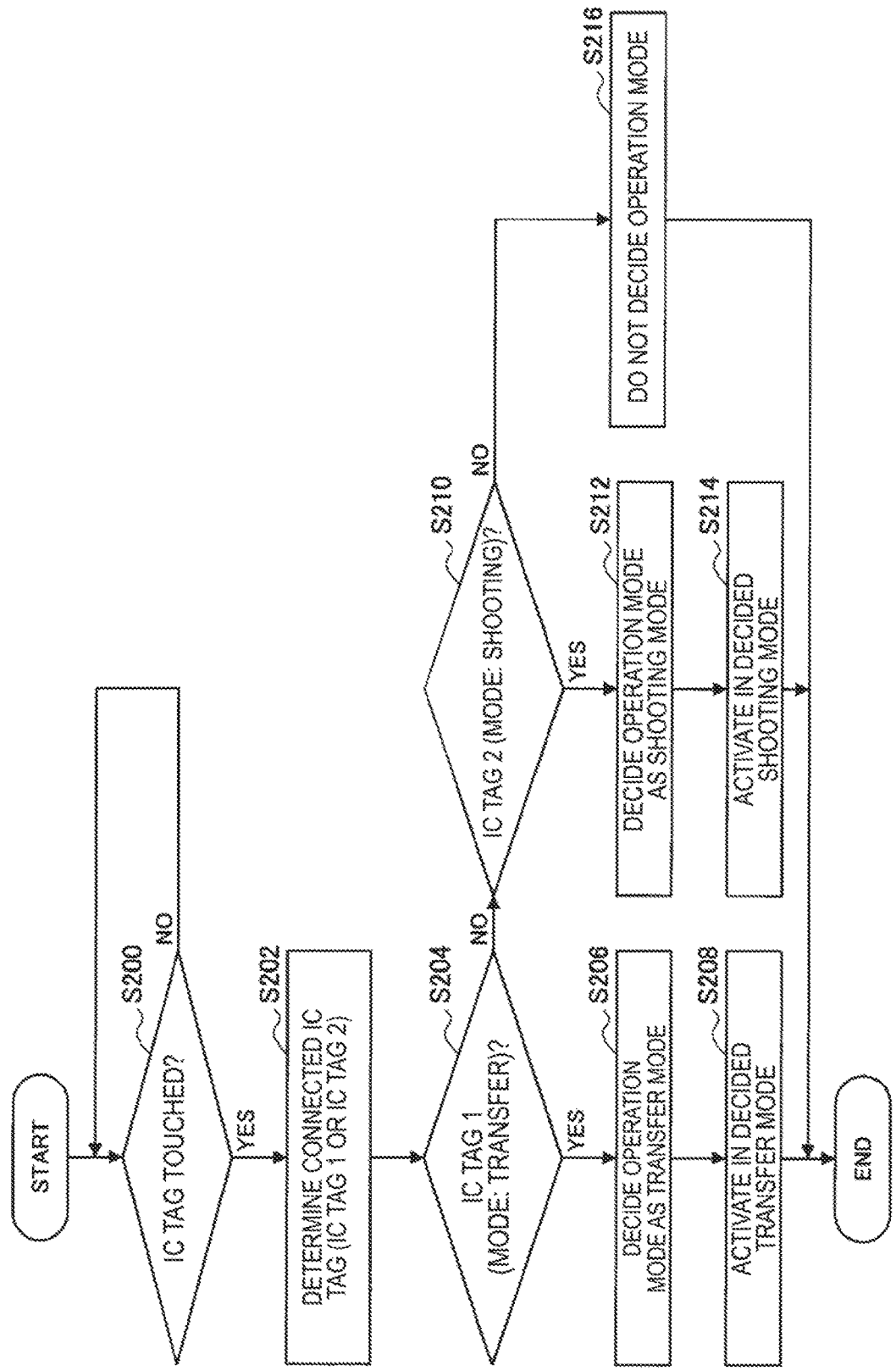
FIG. 4 is a flowchart illustrating another example of processing in the information processing apparatus according to the first embodiment.

FIG. 4 is a flowchart illustrating another example of processing in the information processing apparatus 100 according to the first embodiment.

Here, processes of steps S200 to S206, S210, S212 and S216, for example, correspond to the process of (1) (decision process) in FIG. 4. Processes of steps S208 and S214, for example, correspond to the process of (2) (execution process) in FIG. 4.

FIG. 4 illustrates an example of processing when the information processing apparatus 100 performs the decision process according to the second example described in (1-2). FIG. 4 illustrates an example of processing when the information processing apparatus 100 includes two IC tags, IC tag 1 correlated with the transfer mode and IC tag 2 correlated with the shooting mode. IC tags that may be included in the information processing apparatus 100 are not limited to the two IC tags and the information processing apparatus 100 may include three or more IC tags correlated with the operation modes.

Furthermore, FIG. 4 illustrates an example of processing when the information processing apparatus 100 operates in the transfer mode or the shooting mode. The operation mode in the information processing apparatus 100 is, of course, not limited to the transfer mode or the shooting mode illustrated in FIG. 4.

The information processing apparatus 100 determines whether a touch operation has been performed for an IC tag (S200) as in step S100 of FIG. 3, for example. When it is not determined that the touch operation has been performed for the IC tag in step S200, the information processing apparatus 100 does not perform the processing until it is determined that the touch operation has been performed for the IC tag.

When it is determined that the touch operation has been performed for the IC tag in step S200, the information processing apparatus 100 determines an IC tag performing communication from IC tags connected thereto (S202). The information processing apparatus 100 determines an IC tag performing communication on the basis of, for example, potential change in a terminal connected to the IC tag, a signal indicating execution of communication, which is transmitted from the IC tag, etc.

When the IC tag is determined in step S202, the information processing apparatus 100 decides an operation mode corresponding to the determined IC tag (S204, S206, S210, S212 and S216). Then, the information processing apparatus 100 is activated in the decided operation mode to perform a process corresponding to the decided operation mode (S208 and S214). When the information processing apparatus 100 is in a state in which a process corresponding to one operation mode may be performed, operation modes are switched according to the processes of steps S208 and S214 such that the state in which a process corresponding to one operation mode may be performed is switched to a state in which the process corresponding to the decided operation mode may be performed in the information processing apparatus 100.

More specifically, the information processing apparatus 100 determines whether the IC tag determined in step S202 is IC tag 1 (S204).

When it is determined that the IC tag is IC tag 1 in step S204, the transfer mode correlated to IC tag 1 is decided as an operation mode (S206). Then, the information processing apparatus 100 is activated in the transfer mode to perform a process corresponding to the transfer mode (S208).

When it is not determined that the IC tag is IC tag 1 in step 204, the information processing apparatus 100 determines whether the IC tag determined in step S202 is IC tag 2 (S210).

When it is determined that the IC tag is IC tag 2 in step S210, the shooting mode correlated with IC tag 2 is decided as an operation mode (S212). Then, the information processing apparatus 100 is activated in the shooting mode to perform a process corresponding to the shooting mode (S214).

When it is not determined that the IC tag is IC tag 2 in step S210, the information processing apparatus 100 does not decide the operation mode (S216; exception processing).

The information processing apparatus 100 according to the second embodiment decides an operation mode on the basis of communication of an IC tag and performs the process corresponding to the decided operation mode by executing the process illustrated in FIG. 4, for example, as the processing of the information processing method according to the present embodiment.

Processing in the information processing apparatus 100 is not limited to the example illustrated in FIG. 4.

For example, although FIG. 4 illustrates an example in which the process of step S210 is performed depending on the result of the process of step S204, the information processing apparatus 100 may independently perform the process of step S204, the process of step S210 and the process of step S216 on the basis of the result of IC tag determination in step S202. Accordingly, the information processing apparatus 100 may perform the process of step S204 in response to the result of the process of steps S210 or perform the processes of step S204, S210 and S216 in parallel, for example.

The information processing apparatus 100 according to the first embodiment performs the processes illustrated in FIG. 3 and FIG. 4 as the processing of the information processing method according to the present embodiment. Examples of processing in the information processing apparatus 100 according to the first embodiment are, of course, not limited to the processes illustrated in FIG. 3 and FIG. 4.

[1-3] Configuration of Information Processing Apparatus According to First Embodiment An example of the configuration of the information processing apparatus according to the first embodiment, which may perform the aforementioned processing of the information processing method according to the present embodiment, will be described. Hereinafter, a configuration of the information processing apparatus according to the first embodiment when the process of (1) (decision process) and the process of (2) (execution process) are performed as the processing of the information processing method according to the present embodiment is exemplified.

Figure 5:
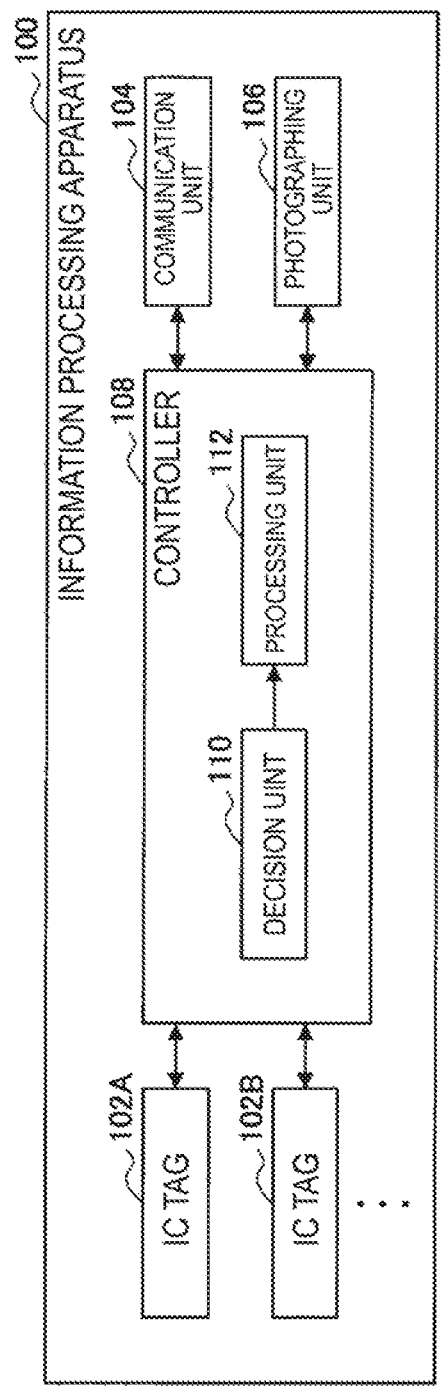
FIG. 5 is a block diagram illustrating an example of a configuration of the information processing apparatus according to the first embodiment.

FIG. 5 is a block diagram illustrating an example of the configuration of the information processing apparatus 100 according to the first embodiment. The information processing apparatus 100 includes, for example, a plurality of IC tags 102A, 102B, . . . , a communication unit 104, a photographing unit 106 and a controller 108. In the following description, there are cases in which one of the plurality of IC tags 102A, 102B, . . . or the IC tags 102A, 102B are collectively referred to as "IC tag 102."

The information processing apparatus 100 may include, for example, a read only memory (ROM) (not shown), a random access memory (RAM) (not shown), a storage unit (not shown), an operation unit (not shown) that may be operated by the user, a display unit (not shown) that displays various images on a display screen and the like. The information processing apparatus 100 connects the aforementioned components, for example, by means of a bus as a data transfer path.

The ROM (not shown) stores data for control, such as programs and operation parameters used by the controller 108. The RAM (not shown) temporarily stores a program executed by the controller 108.

The storage unit (not shown) is a storage means included in the information processing apparatus 100 and stores, for example, data related to the information processing method according to the present embodiment, such as the table in which operation modes and processes are correlated, and data such as various applications. Here, as the storage unit (not shown), for example, a magnetic recording medium such as a hard disk, a nonvolatile memory such as a flash memory or the like may be exemplified. In addition, the storage unit (not shown) may be attachable to/detachable from the information processing apparatus 100.

As the operation unit (not shown), an operation input device which will be described later may be exemplified. As the display unit (not shown), a display device which will be described later may be exemplified.

[Example of Hardware Configuration of Information Processing Apparatus 100]

Figure 6:
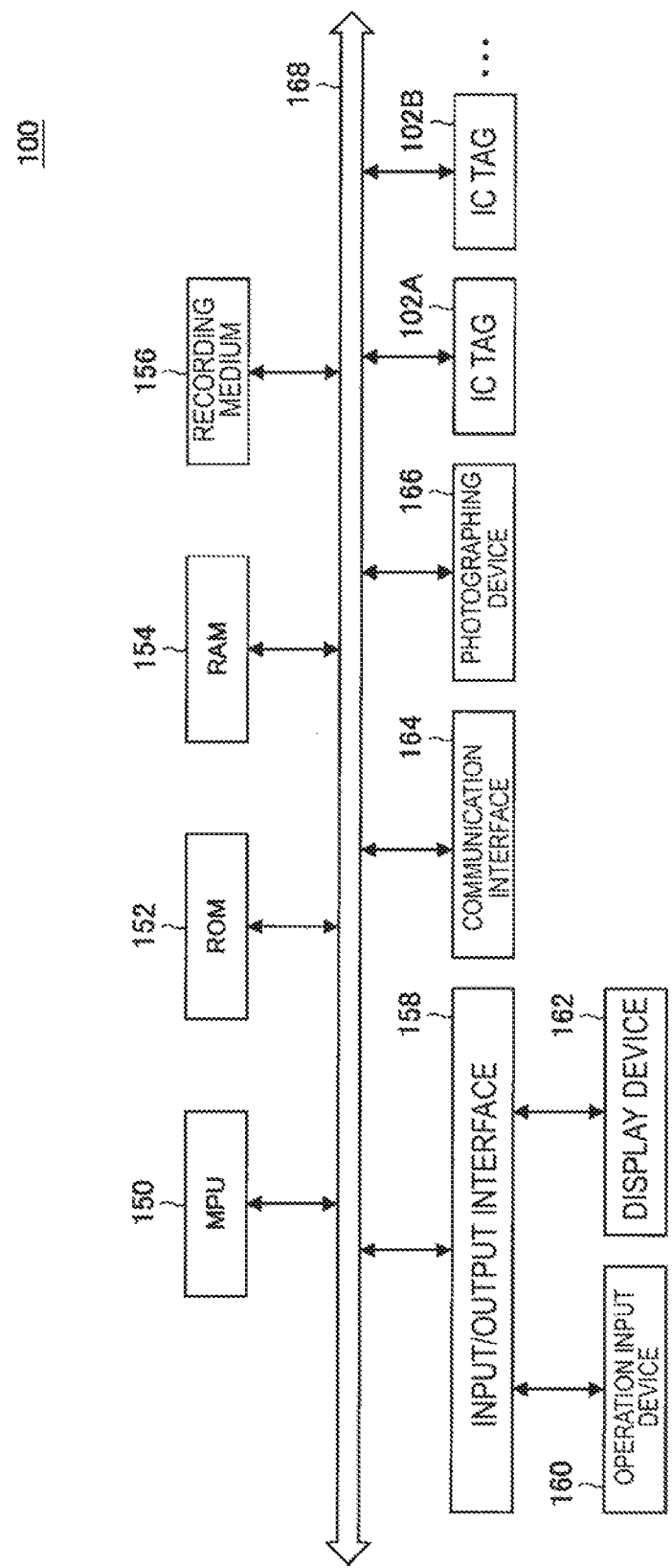
FIG. 6 is an explanatory diagram of an example of a hardware configuration of the information processing apparatus according to the first embodiment.

FIG. 6 is an explanatory diagram of an example of the hardware configuration of the information processing apparatus 100 according to the first embodiment. The information processing apparatus 100 includes, for example, an MPU 150, a ROM 152, a RAM 154, a recording medium 156, an input/output interface 158, an operation input device 160, a display device 162, a communication interface 164, a photographing device 166 and IC tags 102A, 102B, . . . .

In addition, the information processing apparatus 100 connects the components, for example, by means of a bus 168 as a data transfer path.

The MPU 150 is composed of one or more processors configured as operation circuits such as a micro-processing unit (MPU) and various processing circuits and functions as the controller 108 that controls the information processing apparatus 100. In addition, the MPU 150 serves as, for example, a decision unit 110 and a processing unit 112, which will be described later, in the information processing apparatus 100.

The ROM 152 stores data for control, such as programs and operation parameters used by the MPU 150, and the like. The RAM 154 temporarily stores, for example, a program or the like executed by the MPU 150.

The recording medium 156 functions as the storage unit (not shown) and stores, for example, data related to the information processing method according to the present embodiment, such as the table in which operation modes and processes are correlated, and data such as various applications. Here, as the recording medium 156, for example, a magnetic recording medium such as a hard disk or a nonvolatile memory such as a flash memory may be exemplified. Furthermore, the recording medium 156 may be attachable to/detachable from the information processing apparatus 100.

The input/output interface 158 is connected, for example, to the operation input device 160 and the display device 162. The operation input device 160 serves as the operation unit (not shown) and the display device 162 serves as the display unit (not shown). Here, as the input/output interface 158, for example, a universal serial bus (USB) port, a digital visual interface (DVI) terminal, a high-definition multimedia interface (HDMI) (registered trademark) terminal, various processing circuits or the like may be exemplified.

In addition, the operation input device 160 is, for example, included in the information processing apparatus 100 and connected to the input/output interface 158 inside of the information processing apparatus 100. As the operation input device 160, for example, a button, a direction key, a rotary type selector such as a jog dial or a combination thereof may be exemplified.

Furthermore, the display device 162 is, for example, included in the information processing apparatus 100 and connected to the input/output interface 158 inside of the information processing apparatus 100. As the display device 162, for example, a liquid crystal display, an organic electroluminescence display (which is also referred to as an organic light emitting diode (OLED) display) or the like may be exemplified.

Of course, the input/output interface 158 may be connected to an external device such as an external operation input device (e.g., a keyboard, a mouse, etc.) and an external display device as external devices of the information processing apparatus 100. Furthermore, the display device 162 may be, for example, a device that enables display and a user operation, such as a touch screen.

The communication interface 164 is a communication means included in the information processing apparatus 100 and serves as the communication unit 104 for performing wireless or wired communication with an external device via a network (or directly). Here, as the communication interface 164, for example, a communication antenna and a radio frequency (RF) circuit (wireless communication), an IEEE 802.15.1 port and a transmission/reception circuit (wireless communication), an IEEE 802.11 port and a transmission/reception circuit (wireless communication), a local area network (LAN) terminal and a transmission/reception circuit (wired communication) or the like may be exemplified. In addition, as a network according to the present embodiment, for example, a wired network such as a LAN or a wide area network (WAN), a wireless network such as a wireless LAN (WLAN), the Internet using a communication protocol such as a transmission control protocol/Internet protocol (TCP/IP) or the like may be exemplified.

The photographing device 166 is a photographing means included in the information processing apparatus 100 and generates an image (still image or moving image) according to photographing.

As the photographing device 166, for example, a lens/photographing device and a signal processing circuit may be exemplified. The lens/photographing device is composed of, for example, an optical lens and an image sensor using a plurality of photographing devices, such as a complementary metal oxide semiconductor (CMOS). The signal processing circuit includes an automatic gain control (AGC) circuit and an analog-to-digital converter (ADC), for example, and converts an analog signal generated by the photographing device into a digital signal (video data). Furthermore, the signal processing circuit may perform various signal processes such as white balance correction processing, tonal correction processing, gamma correction processing, YCbCr conversion processing and edge emphasizing processing.

As the IC tags 102A, 102B, . . . , for example, IC tags corresponding to NFC, such as RFID tags, may be exemplified.

The information processing apparatus 100 performs the processing of the information processing method according to the present embodiment, for example, according to the configuration illustrated in FIG. 6. The hardware configuration of the information processing apparatus 100 according to the first embodiment is not limited to the configuration illustrated in FIG. 6.

For example, the information processing apparatus 100 may not include the communication interface 164 when the information processing apparatus 100 performs communication with an external device via an external communication device connected thereto.

The information processing apparatus 100 may have a configuration that does not include the recording medium 156, the operation input device 160, the display device 162, or the photographing device 166, for example.

For example, when the information processing apparatus 100 performs the decision process according to the third example described in (1-3) as the processing of the information processing method according to the present embodiment, the information processing apparatus 100 may have a configuration that does not include the IC tags 102A, 102B, . . . . In the case of a configuration that does not include the IC tags 102A, 102B, . . . , for example, the IC tags 102A, 102B, . . . are attached to the surface of the body of the information processing apparatus 100 according to sealing or the like.

An example of the configuration of the information processing apparatus 100 will be described with reference to FIG. 5. The IC tag 102 performs communication with an external device. The IC tag 102 performs communication with the external device, for example, when the user performs a touch operation using the external device.

The communication unit 104 is a communication means included in the information processing apparatus 100 and performs wireless or wired communication with the external device via a network (or directly). Communication of the communication unit 104 is controlled by the controller 108.

Here, while a communication antenna and an RF circuit, a LAN terminal and a transmission/reception circuit or the like may be exemplified as the communication unit 104, for example, the configuration of the communication unit 104 is not limited thereto. For example, the communication unit 104 may have a configuration corresponding to an arbitrary standard which may perform communication of a USB port, a transmission/reception circuit and the like, or an arbitrary configuration that enables communication with an external device via a network. In addition, the communication unit 104 may have a configuration that enables communication with one or more external devices according to a plurality of communication schemes.

The photographing unit 106 is a photographing means included in the information processing apparatus 100 and generates an image according to photographing. As the photographing unit 106, for example, the photographing device 166 illustrated in FIG. 6 may be exemplified.

The controller 108 is configured with, an MPU, for example, and controls the whole information processing apparatus 100. In addition, the controller 108 includes, for example, the decision unit 110 and the processing unit 112 and actively performs the processing of the information processing method according to the present embodiment.

The decision unit 110 actively performs the process of (1) (decision process) and decides an operation mode on the basis of communication of the IC tag 102. The decision unit 110 performs, for example, any of the decision process according to the first example described in (1-1) to the decision process according to the fourth example described in (1-4).

The processing unit 112 actively performs the process of (2) (execution process) and performs a process corresponding to the operation mode decided by the decision unit 110. The processing unit 112 specifies the process corresponding to the operation mode decided by the decision unit 110 with reference to, for example, a table in which operation modes and processes are correlated, which is stored in a recording medium such as a recording unit (not shown), and performs the specified process.

The controller 108 actively performs the processing of the information processing method according to the present embodiment by including the decision unit 110 and the processing unit 112, for example.

The information processing apparatus 100 performs the processing of the information processing method according to the present embodiment (e.g., the process of (1) (decision process) and the process of (2) (execution process)) according to, for example, the configuration illustrated in FIG. 5.

Accordingly, the information processing apparatus 100 may improve user convenience according to, for example, the configuration illustrated in FIG. 5.

In addition, the information processing apparatus 100 may achieve the effect obtained by performing the processing of the information processing method according to the present embodiment as described above, for example, according to the configuration illustrated in FIG. 5.

The configuration of the information processing apparatus according to the first embodiment is not limited to the configuration illustrated in FIG. 5.

For example, the information processing apparatus according to the first embodiment may have a configuration that does not include the processing unit 112 illustrated in FIG. 5.

Even when the information processing apparatus according to the first embodiment has a configuration that does not include the processing unit 112, the information processing apparatus according to the first embodiment may decide an operation mode on the basis of communication of the IC tag 102 according to the process of (1) (decision process). Accordingly, the information processing apparatus according to the first embodiment may improve user convenience even when the information processing apparatus according to the first embodiment has a configuration that does not include the processing unit 112

When the information processing apparatus has a configuration that does not include the processing unit 112, for example, a process corresponding to an operation mode decided by an external device of the information processing apparatus according to the first embodiment is controlled to realize an operation in the decided operation mode in the information processing apparatus according to the first embodiment.

Furthermore, the information processing apparatus according to the first embodiment may include one or both of the decision unit 110 and the processing unit 112 illustrated in FIG. 5 separately from the controller 108 (e.g., implemented as a separate processing circuit).

As described above, the process of (1) (decision process) and the process of (2) (execution process) are divisions of the processing of the information processing method according to the present embodiment for convenience. Accordingly, the configuration for implementing the processing of the information processing method according to the present embodiment is not limited to the decision unit 110 and the processing unit 112 illustrated in FIG. 5 and may be a configuration according to division of the processing of the information processing method according to the present embodiment.

For example, when communication with an external device via an external communication device having the same function and configuration as the communication unit 104 is performed, the information processing apparatus according to the first embodiment may not include the communication unit 104.

Furthermore, the information processing apparatus according to the first embodiment may have a configuration that does not include the photographing unit 106.

Moreover, the information processing apparatus according to the first embodiment may further include, for example, a notification unit (not shown) for notifying the user of an IC tag performing communication. The notification unit (not shown) visually and/or aurally notifies the user of an IC tag performing communication. For example, the notification unit (not shown) visually notifies the user of an IC tag performing communication using a character and a figure, light or a combination thereof and aurally notifies the user of an IC tag performing communication using a sound (including music). Notification according to the notification unit (not shown) is controlled by the controller 108, for example.

As the notification unit (not shown), for example, the display device 162 illustrated in FIG. 6, a digital signal processor (DSP), a speaker or the like may be exemplified.

When the information processing apparatus according to the first embodiment includes the notification unit (not shown), the user who has performed a touch operation may recognize the IC tag performing communication and thus more easily recognize the operation mode of the information processing apparatus according to the first embodiment.

When the information processing apparatus according to the first embodiment performs the decision process according to the third example described in (1-3) as the processing of the information processing method according to the present embodiment, the information processing apparatus may have a configuration that does not include some or all of the plurality of IC tags 102. In the case of a configuration that does not include the IC tag 102, the IC tag 102 may be attached to the surface of the body of the information processing apparatus 100 according to sealing or the like, for example.

While the information processing apparatus has been described as the first embodiment, the first embodiment is not limited thereto. For example, the first embodiment may be applied to, for example, various apparatuses having a plurality of functions, such as photographing devices such as a digital steel camera, a digital video camera or a lens style camera as illustrated in FIG. 2, communication devices such as a cellular phone or a smart phone, tablet type devices, computers such as a personal computer (PC), display devices, TV receivers, video/music players (or video/music recording/replay device), game machines, vehicles such as automobiles, and audio systems. In addition, the present embodiment may be applied to, for example, a processing IC that may be integrated into the aforementioned devices.

[2] Information Processing Apparatus According to Second Embodiment

An information processing apparatus that determines an operation mode of a target apparatus on the basis of tag information acquired from an IC tag will be described as the second embodiment.

The information processing apparatus according to the second embodiment corresponds to a communication device such as the smart phone in the example illustrated in FIG. 2. The information processing apparatus according to the second embodiment is not limited to the communication device illustrated in FIG. 2. There are cases below in which the information processing apparatus according to the second embodiment is described as an "information processing apparatus 200."

A target apparatus according to the second embodiment corresponds to the photographing apparatus in the example illustrated in FIG. 2. Of course, the target apparatus according to the second embodiment is not limited to the photographing apparatus illustrated in FIG. 2.

[2-1] Processing in Information Processing Apparatus According to Second Embodiment The information processing apparatus 200 performs, for example, (I) a decision process and (II) an operation control process, which will be described below, as processing of an information processing method according to the present embodiment. As described above, the information processing apparatus 200 may not perform the process of (II) (operation control process) described below.

(I) Decision Process

The information processing apparatus 200 decides an operation mode of the target apparatus on the basis of tag information acquired from an IC tag. For example, the information processing apparatus 200 decides an operation mode corresponding to information about an operation mode included in the tag information.

More specifically, when the information about an operation mode is the information indicating an operation mode, represented by D3 in FIG. 1, for example, the information processing apparatus 200 decides the operation mode indicated by the information representing an operation mode as its own operation mode.

When the information about an operation mode is the preset information represented by D4 in FIG. 1, for example, the information processing apparatus 200 decides the preset mode as its own operation mode.

Here, the information processing apparatus 200 acquires tag information from an IC tag by performing communication with the IC tag, for example, through an acquisition unit (which will be described later) included therein. In addition, the information processing apparatus 200 may acquire the tag information from the IC tag, for example, through communication between the IC tag and an external acquisition device having the same function as the acquisition unit (which will be described later) connected to the information processing apparatus 200.

As communication between the acquisition unit (which will be described later) and the IC tag, NFC may be exemplified. When communication between the acquisition unit (which will be described later) and the IC tag is NFC, the acquisition unit (not shown) serves as a reader/writer (or interrogator), for example.

The information processing apparatus 200 acquires the tag information from the IC tag, for example, by transmitting a tag information transmission request to the IC tag through the acquisition unit (not shown).

The information processing apparatus 200 decides an operation mode, for example, whenever tag information is acquired. When the information processing apparatus 200 decides an operation mode whenever tag information is acquired, operation mode switching in the target apparatus by a touch operation of the user is achieved, for example, according to the process of (II) (operation control process) which will be described below.

(II) Operation Control Process

The information processing apparatus 200 causes the target apparatus to perform a process corresponding to the operation mode decided according to the process of (I) (decision process).

The information processing apparatus 200 causes a communication unit (which will be described later) included therein or an external communication device connected thereto to perform communication with the target apparatus, for example, on the basis of information about communication with the target apparatus, which is included in the acquired tag information. In addition, the information processing apparatus 200 transmits an operation request for performing the process corresponding to the operation mode decided by the process of (I) (decision process) to the target apparatus through communication with the target apparatus.

Here, the operation request transmitted by the information processing apparatus 200 includes, for example, the information about an operation mode, as described above. Furthermore, the operation request transmitted by the information processing apparatus 200 may further include an operation command for performing the process corresponding to the operation mode and identification information indicating the information processing apparatus 200 (an example of an apparatus that transmits the operation request).

The information processing apparatus 200 according to the second embodiment performs, for example, the process of (I) (decision process) and the process of (II) (operation control process) as the processing of the information processing method according to the present embodiment.

Here, the information processing apparatus 200 decides an operation mode of the target apparatus on the basis of the tag information acquired from the IC tag according to the process of (I) (decision process). In addition, the information processing apparatus 200 allows the target apparatus to perform the process corresponding to the operation mode according to the process of (II) (operation control process).

Accordingly, the information processing apparatus 200 may improve user convenience by performing the process of (I) (decision process) and the process of (II) (operation control process).

The processing of the information processing method according to the present embodiment is not limited to the process of (I) (decision process) and the process of (II) (operation control process). For example, when an external device of the information processing apparatus 200 performs the process of (II) (operation control process), the information processing apparatus 200 may not perform the process of (II) (operation control process).

Furthermore, the process of (I) (decision process) and the process of (II) (operation control process) are divisions of the processing of the information processing method according to the present embodiment for convenience. Accordingly, the processing of the information processing method according to the present embodiment may recognize the process of (I) (decision process) and the process of (II) (operation control process) as a single process or two or more processes (according to an arbitrary division scheme).

[2-2] Detailed Examples of Information Processing Apparatus According to Second Embodiment Detailed examples of processing in the information processing apparatus 200 according to the second embodiment will be described.

Figure 7:
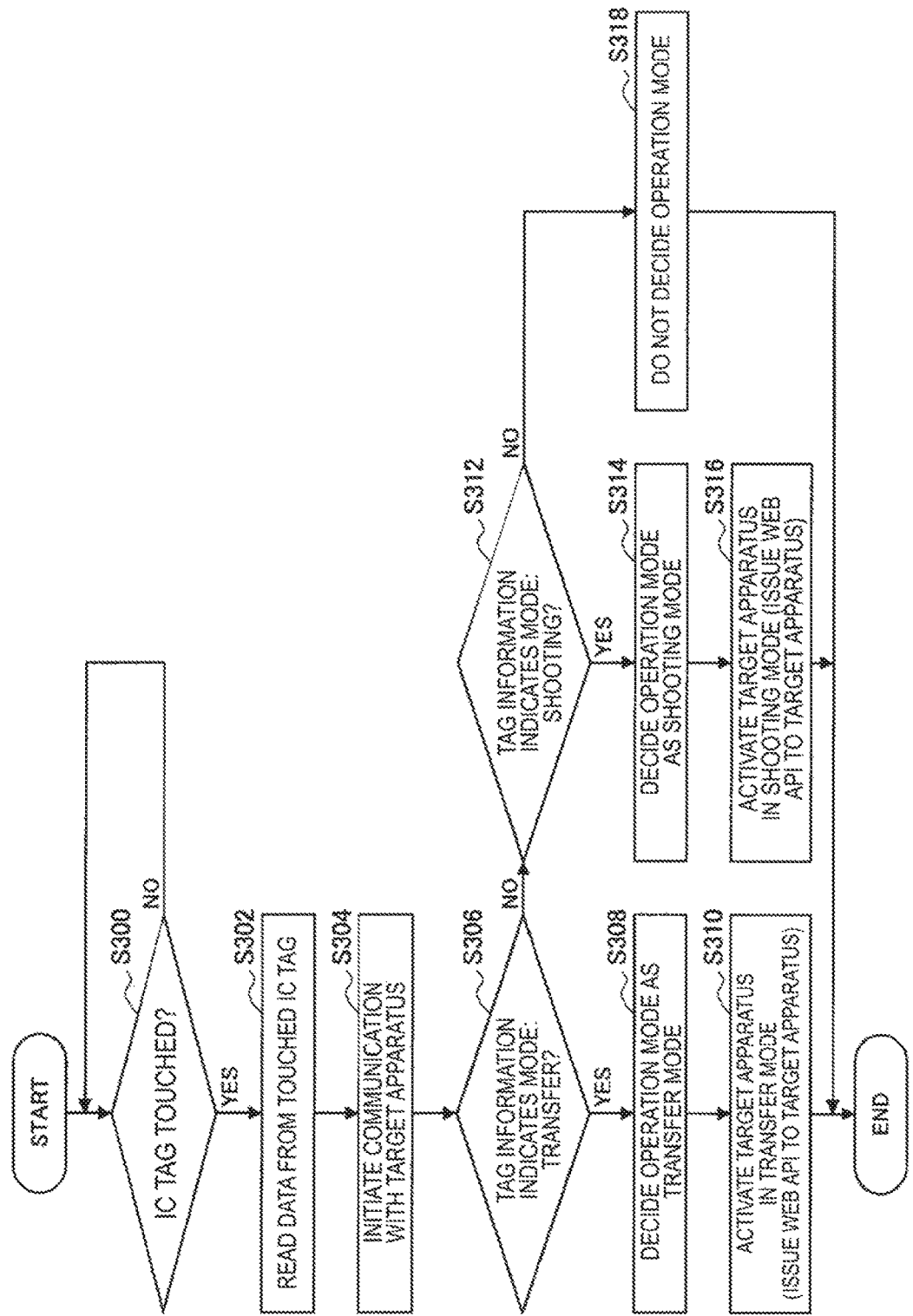
FIG. 7 is a flowchart illustrating an example of processing in an information processing apparatus according to a second embodiment.

FIG. 7 is a flowchart illustrating an example of processing in the information processing apparatus 200 according to the second embodiment.

Here, steps S300, S302, S306, S308, S312, S314 and S318, for example, correspond to the process of (I) (decision process) in FIG. 7. In addition, steps S304, S310 and S316, for example, correspond to the process of (II) (operation control process) in FIG. 7.

FIG. 7 illustrates an example of processing when the information processing apparatus 200 decides the transfer mode or the shooting mode as an operation mode (e.g., the target apparatus is an apparatus operating in the transfer mode or the shooting mode). Of course, operation modes that may be decided by the information processing apparatus 200 are not limited to the transfer mode and the shooting mode illustrated in FIG. 7.

In FIG. 7, a case in which tag information has the data structure represented by A in FIG. 1 is exemplified.

The information processing apparatus 200 determines whether a touch operation has been performed for an IC tag (S300). The information processing apparatus 200 causes, for example, the acquisition unit (which will be described later) or the like to transmit a polling signal and, when a response signal to the polling signal is detected, determines that the touch operation has been performed for the IC tag.

Here, although the information processing apparatus 200 performs determination of step S300 by causing the acquisition unit (which will be described later) to transmit the polling signal on a permanent basis, processing in the information processing apparatus 200 is not limited thereto. For example, when an object is detected within a coverage area, the information processing apparatus 200 may allow the acquisition unit (which will be described later) or the like to transmit the polling signal on the basis of a detection result of a sensor that may detect the object. When the polling signal is selectively transmitted on the basis of the detection result of the sensor, power for the process of step S300 may be reduced compared to a case in which the polling signal is transmitted on a permanent basis.

As the sensor, for example, an infrared sensor, a distance sensor that may estimate a distance to an object and the like may be exemplified. The sensor may be included in the information processing apparatus 200 or may be an external sensor connected to the information processing apparatus 200.

When it is not determined that the touch operation has been performed for the IC tag in step S300, the information processing apparatus 200 does not perform the processing until it is determined that the touch operation has been performed for the IC tag.

When it is determined that the touch operation has been performed for the IC tag in step S300, the information processing apparatus 200 reads tag information from the IC tag for which the touch operation has been performed (i.e., IC tag performing communication) (S302). The information processing apparatus 200 acquires the tag information from the IC tag for which the touch operation has been performed, for example, by transmitting a tag information transmission request through the acquisition unit (which will be described later).

When the tag information is read in step S302, the information processing apparatus 200 decides an operation mode on the basis of the acquired tag information (S306, S308, S312, S314 and S318). In addition, the information processing apparatus 200 transmits, for example, an operation request for performing a process corresponding to the decided operation mode to the target apparatus to activate the target apparatus in the decided operation mode and cause the target apparatus to perform the process corresponding to the decided operation mode (S310 and S316). When the target apparatus is in a state in which the target apparatus may perform a process corresponding to one operation mode, the operation mode of the target apparatus is switched according to the processes of steps S310 and S316 such that the state in which the target apparatus may perform the process corresponding to one operation mode is changed to a state in which the target apparatus may perform the process corresponding to the decided operation mode.

More specifically, the information processing apparatus 200 initiates communication with the target apparatus (S304). The information processing apparatus 200 starts communication with the target apparatus using, for example, information about communication with the target apparatus (e.g., D1 and D2 illustrated in FIG. 1), which is included in the acquired tag information.

Although FIG. 7 illustrates an example in which the information processing apparatus 200 performs the process of step S304 prior to the process of step S306, the information processing apparatus 200 may perform the process of step S304 in parallel with, for example, steps S306, S308, S312 and S314 which will be described below. Furthermore, the information processing apparatus 200 may perform the process of step S304, for example, after performing the process of step S308 or the process of step S314.

The information processing apparatus 200 determines whether the tag information indicates the transfer mode, for example, as in step S104 of FIG. 3 (S306).

When it is determined that the tag information indicates the transfer mode in step S306, the information processing apparatus 200 determines the transfer mode as an operation mode (S308). In addition, the information processing apparatus 200 transmits an operation request for performing a process corresponding to the transfer mode to the target apparatus to activate the target apparatus in the transfer mode and cause the target apparatus to perform the process corresponding to the transfer mode (S310).

When it is not determined that the tag information indicates the transfer mode in step S306, the information processing apparatus 200 determines whether the tag information indicates the shooting mode (S312), for example, as in step S110 of FIG. 3.

When it is determined that the tag information indicates the shooting mode in step S310, the information processing apparatus 200 determines the shooting mode as an operation mode (S314). In addition, the information processing apparatus 200 transmits an operation request for performing a process corresponding to the shooting mode to the target apparatus to activate the target apparatus in the shooting mode and cause the target apparatus to perform the process corresponding to the shooting mode (S316).

When it is not determined that the tag information indicates the shooting mode in step S312, the information processing apparatus 200 does not determine the operation mode (S318; exception processing).

The information processing apparatus 200 according to the second embodiment decides an operation mode of the target apparatus on the basis of the tag information acquired from the IC tag and allows the target apparatus to perform a process corresponding to the decided operation mode by performing, for example, the process illustrated in FIG. 7, as the processing of the information processing method according to the present embodiment.

Furthermore, the information processing apparatus 200 may repeatedly perform the process illustrated in FIG. 7 whenever the user performs a touch operation for the IC tag to realize operation mode switching in the target apparatus according to the touch operation of the user.

The process in the information processing apparatus 200 is not limited to the example illustrated in FIG. 7.

For example, while FIG. 7 illustrates an example in which the process of step S312 is performed in response to the result of the process of step S306, the information processing apparatus 100 may independently perform the process of step S306 and the process of step S312 on the basis of the acquired tag information. Accordingly, the information processing apparatus 200 may perform the process of step S306 in response to the result of the process of step S312 or perform the process of step S306 and the process of step S312 in parallel, for example.

[2-3] Processing in Target Apparatus for which Operation Mode is Determined by Information Processing Apparatus According to Second Embodiment An example of processing in the target apparatus for which an operation mode is determined by the information processing apparatus 200 will be described. The target apparatus has, for example, the same hardware configuration as the information processing apparatus 100 (including modifications) according to the first embodiment illustrated in FIG. 6 and, in the target apparatus, processing is performed by one or more processors configured with an operation circuit such as an MPU. Hereinafter, processing in the target apparatus when the information processing apparatus 200 performs the process illustrated in FIG. 7 is exemplified.

Figure 8:
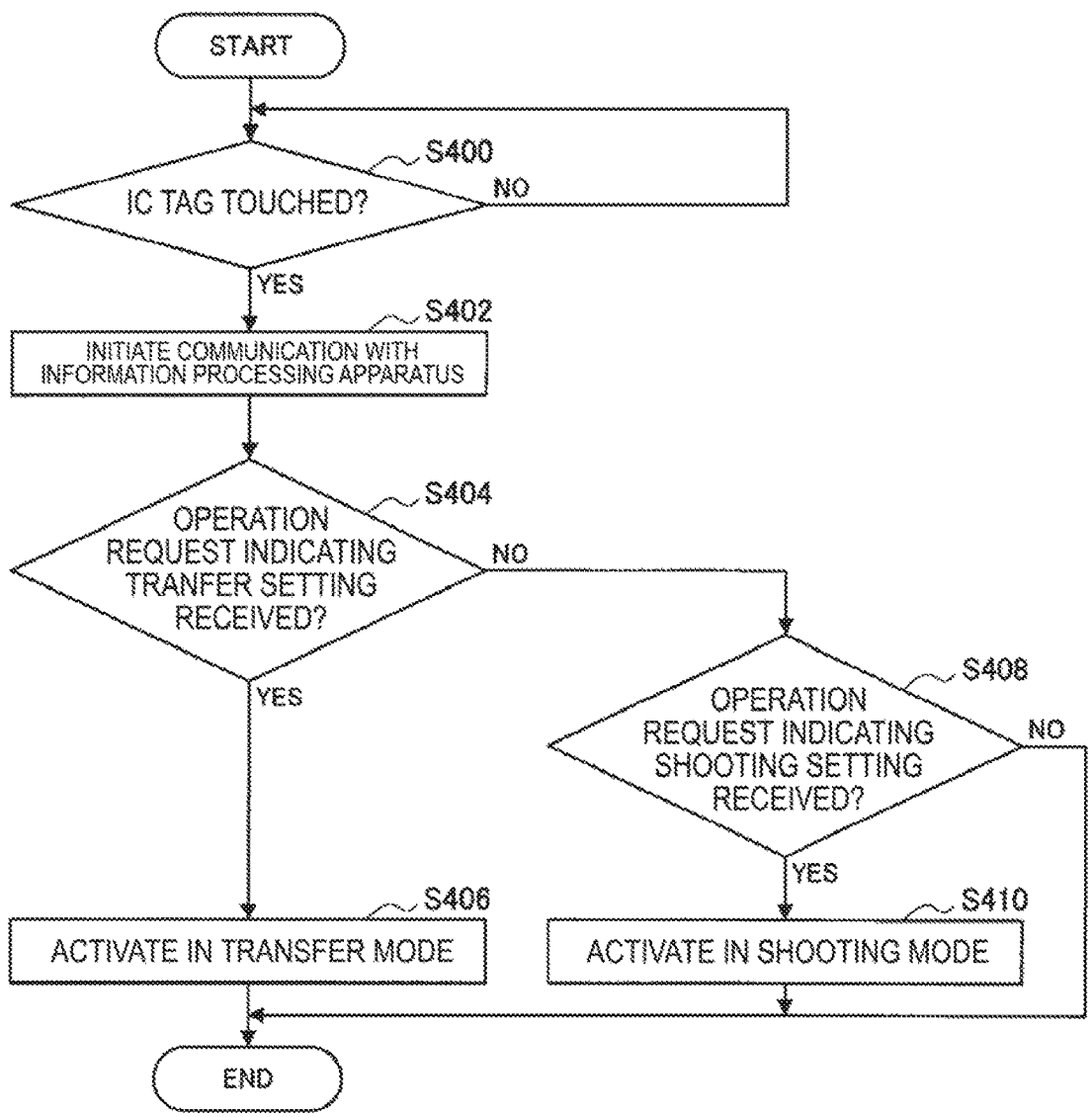
FIG. 8 is a flowchart illustrating an example of processing in a target apparatus for which an operation mode is decided by the information processing apparatus according to the second embodiment.

FIG. 8 is a flowchart illustrating an example of processing in the target apparatus for which an operation mode is determined by the information processing apparatus 200 according to the second embodiment.

The target apparatus determines whether a touch operation has been performed for an IC tag (S400).

For example, when the target apparatus includes the IC tag, the target apparatus performs determination of step S400 through the same process as step S100 of FIG. 3 as the process of step S400.

For example, when the target apparatus does not include the IC tag and the IC tag is attached to the target apparatus, the target apparatus may determine that the touch operation has been performed for the IC tag when an object is detected within a coverage range of the IC tag, on the basis of a detection result of a sensor that may sense the object. As the sensor, for example, an infrared sensor, an arbitrary type of distance sensor that may estimate a distance to an object and the like may be exemplified. Furthermore, the sensor may be included in the target apparatus or may be an external sensor connected to the target apparatus.

When it is not determined that the touch operation has been performed for the IC tag in step S400, the target apparatus does not perform the processing until it is determined that the touch operation has been performed for the IC tag.

When it is determined that the touch operation has been performed for the IC tag in step S400, the target apparatus initiates communication with the information processing apparatus 200 (S402). For example, the target apparatus initiates communication with the information processing apparatus 200 when the information processing apparatus 200 performs the process of step S304 of FIG. 7. The target apparatus performs communication with the information processing apparatus 200, for example, through a communication device included therein or an external communication device connected thereto.

When communication with the information processing apparatus 200 is initiated in step S402, the target apparatus waits to receive an operation request transmitted from the information processing apparatus 200. For example, when the operation request includes data for calling an API such as a web API, the target apparatus waits to receive the data. When the operation request is received, the target apparatus performs a process corresponding to an operation mode indicated by the operation request (S404 to S410).

More specifically, it is determined whether an operation request indicating the transfer mode is received from the information processing apparatus 200 (S404). The target apparatus receives the operation request indicating the transfer mode, for example, when the process of step S310 illustrated in FIG. 7 is performed in the information processing apparatus 200.

When it is determined that the operation request indicating the transfer mode is received in step S404, the target apparatus is activated in the transfer mode to perform a process corresponding to the transfer mode (S406).

When it is not determined that the operation request indicating the transfer mode is received in step S404, the target apparatus determines whether an operation request indicating the shooting mode is received from the information processing apparatus 200 (S408). The target apparatus receives the operation request indicating the shooting mode, for example, when the information processing apparatus 200 performs the process of step S316 illustrated in FIG. 7.

When it is determined that the operation request indicating the shooting mode is received in step S408, the target apparatus is activated in the shooting mode to perform a process corresponding to the shooting mode (S410).

When it is not determined that the operation request indicating the shooting mode is received in step S410, the target apparatus does not perform the processing (exception processing).

In the target apparatus for which an operation mode is determined by the information processing apparatus 200, the process corresponding to the operation mode decided by the information processing apparatus 200 is performed, for example, according to the process illustrated in FIG. 8.

The processes in the target apparatus are not limited to the example illustrated in FIG. 8.

For example, while FIG. 8 illustrates an example in which the process of step S408 is performed in response to the result of the process of step S404, the target apparatus may independently perform the process of step S404 and the process of step S408 on the basis of a received operation request. Accordingly, the target apparatus may perform the process of step S404 in response to the result of the process of step S408 or perform the process of step S404 and the process of step S408 in parallel, for example.

Furthermore, the target apparatus may have a function of performing a process corresponding to an operation mode decided by each of a plurality of information processing apparatuses 200, for each information processing apparatus 200, on the basis of an operation request transmitted from each information processing apparatus 200. In addition, the target apparatus has a function of simultaneously activating a plurality of operation modes or a function of switchably activating a plurality of operation modes, for example.

For example, the target apparatus recognizes the information processing apparatus 200 through identification information transmitted from the information processing apparatus 200 and performs a process corresponding to an operation mode decided by the recognized information processing apparatus 200, for each information processing apparatus 200. The identification information may be included in an operation request transmitted from the information processing apparatus 200 or may be transmitted separately from the operation request, for example.

Figure 9:
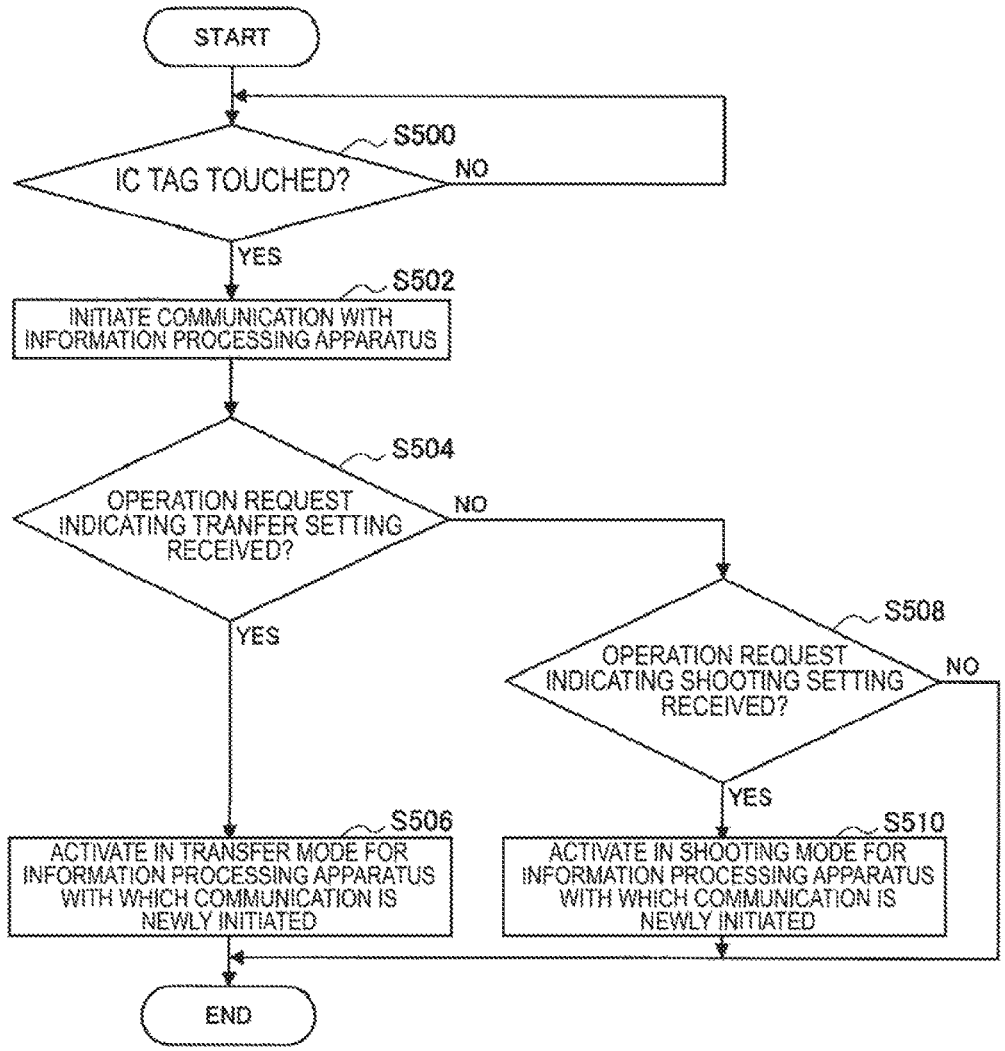
FIG. 9 is a flowchart illustrating another example of processing in the target apparatus for which an operation mode is decided by the information processing apparatus according to the second embodiment.

FIG. 9 is a flowchart illustrating another example of processing in the target apparatus for which an operation mode is determined by the information processing apparatus 200 according to the second embodiment. FIG. 9 illustrates an example of processing when an operation is performed in an operation mode decided by a single information processing apparatus 200 according to the process illustrated in FIG. 8 and a separate operation is performed in an operation mode decided by another information processing apparatus 200.

The target apparatus determines whether a touch operation has been performed for an IC tag (S500) as in step S400 of FIG. 8, for example.

When it is not determined that the touch operation has been performed for the IC tag in step S500, the target apparatus does not perform the processing until it is determined that the touch operation has been performed for the IC tag.

When it is determined that the touch operation has been performed for the IC tag in step S500, the target apparatus initiates communication with the information processing apparatus 200 (S502) as in step S402 of FIG. 8, for example.

When communication with the information processing apparatus 200 is initiated in step S502, the target apparatus waits to receive an operation request transmitted from the information processing apparatus 200. When the operation request is received, the target apparatus performs a process corresponding to an operation mode indicated by the operation request (S504 to S510). Here, the target apparatus recognizes the information processing apparatus 200 through identification information transmitted from the information processing apparatus 200 and performs a process corresponding to the operation mode indicated by the operation request for the recognized information processing apparatus 200.

An example of processing of the target apparatus when the information processing apparatus 200 for which communication is initiated in step 502 differs from the information processing apparatus 200 for which communication is initiated in step S402 of FIG. 8 will be described in more detail through the example of FIG. 9.

It is determined whether an operation request indicating the transfer mode is received from the information processing apparatus 200 for which communication is initiated in step S502 (S504).

When it is determined that the operation request indicating the transfer mode is received in step S504, the target apparatus is activated in the transfer mode for the information processing apparatus 200 for which communication is initiated in step S502 and performs a process corresponding to the transfer mode (S506).

When it is not determined that the operation request indicating the transfer mode is received in step S504, the target apparatus determines whether an operation request indicating the shooting mode is received from the information processing apparatus 200 for which communication is initiated in step S502 (S508).

When it is determined that the operation request indicating the shooting mode is received in step S508, the target apparatus is activated in the shooting mode for the information processing apparatus 200 for which communication is initiated in step S502 and performs a process corresponding to the shooting mode (S510).

When it is not determined that the operation request indicating the shooting mode is received in step S510, the target apparatus does not perform the processing (exception processing).

In the target apparatus for which an operation mode is determined by the information processing apparatus 200, a process corresponding to an operation mode decided by each of a plurality of information processing apparatuses 200 is performed for each information processing apparatus 200 according to the processing illustrated in FIG. 9, for example. Accordingly, when the target apparatus performs the processing illustrated in FIG. 9, the operation of one target apparatus is controlled by a plurality of information processing apparatuses 200.

Processing in a target apparatus having a function of performing a process corresponding to an operation mode decided by each information processing apparatus 200 for each information processing apparatus 200 is not limited to the example illustrated in FIG. 9.

For example, while FIG. 9 illustrates an example in which the process of step S508 is performed in response to the result of the process of step S504, the target apparatus may independently perform the process of step S504 and the process of step S508 on the basis of a received operation request. Accordingly, the target apparatus may perform the process of step S504 in response to the result of the process of step S508 or perform the process of step S504 and the process of step S508 in parallel.

[2-4] Configuration of Information Processing Apparatus According to Second Embodiment An example of the configuration of the information processing apparatus according to the second embodiment, which may perform the processing of the aforementioned information processing method according to the present embodiment, will be described. Hereinafter, a configuration of the information processing apparatus according to the second embodiment when the process of (I) (decision process) and the process of (II) (operation control process) are performed as the processing of the information processing method according to the present embodiment is exemplified.

Figure 10:
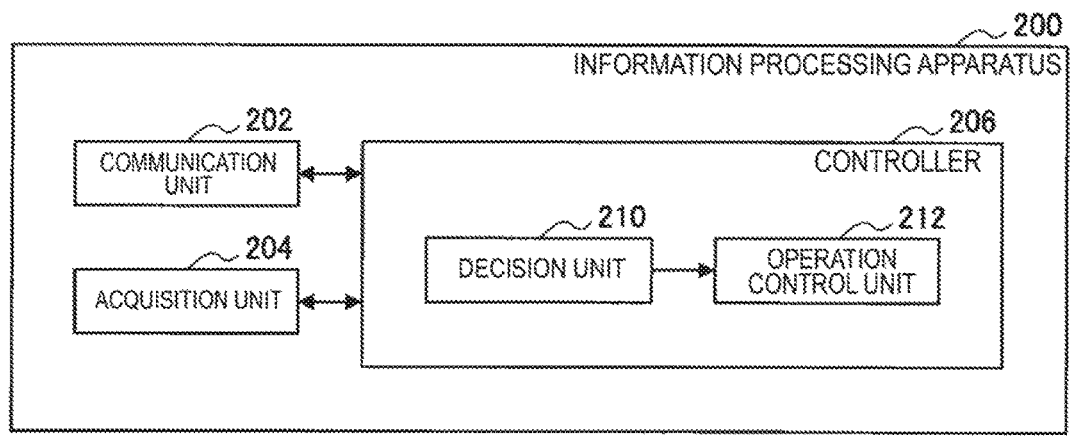
FIG. 10 is a block diagram illustrating an example of a configuration of the information processing apparatus according to the second embodiment.

FIG. 10 is a block diagram illustrating an example of the configuration of the information processing apparatus 200 according to the second embodiment. The information processing apparatus 200 includes, for example, a communication unit 202, an acquisition unit 204 and a controller 206.

The information processing apparatus 200 may include, for example, a ROM (not shown), a RAM (not shown), a storage unit (not shown), an operation unit (not shown) that may be manipulated by the user, a display unit (not shown) displaying various images on a display screen, etc. The information processing apparatus 200 connects the aforementioned components, for example, using a bus as a data transfer path.

The ROM (not shown) stores data for control, such as programs and operation parameters used by the controller 206. The RAM (not shown) temporarily stores a program executed by the controller 206.

The storage unit (not shown) is a storage means included in the information processing apparatus 200 and stores, for example, data such as various applications. Here, as the storage unit (not shown), for example, a magnetic recording medium such as a hard disk, a nonvolatile memory such as a flash memory or the like may be exemplified. In addition, the storage unit (not shown) may be attachable to/detachable from the information processing apparatus 200.

As the operation unit (not shown), an operation input device which will be described later may be exemplified. As the display unit (not shown), a display device which will be described later may be exemplified.

[Example of Hardware Configuration of Information Processing Apparatus 200]

Figure 11:
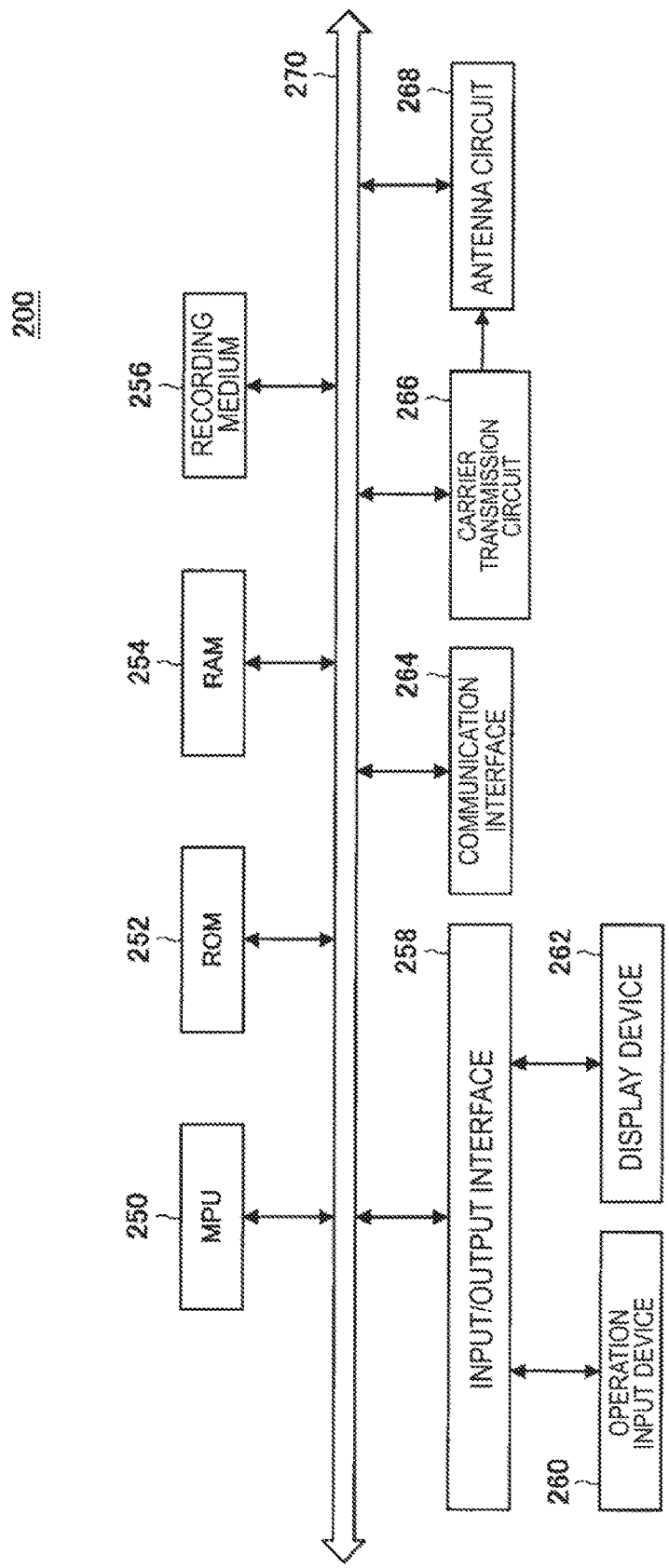
FIG. 11 is an explanatory diagram of an example of a hardware configuration of the information processing apparatus according to the second embodiment.

FIG. 11 is an explanatory diagram of an example of the hardware configuration of the information processing apparatus 200 according to the second embodiment. The information processing apparatus 200 includes, for example, an MPU 250, a ROM 252, a RAM 254, a recording medium 256, an input/output interface 258, an operation input device 260, a display device 262, a communication interface 264, a carrier transmission circuit 266 and an antenna circuit 268. In addition, the information processing apparatus 200 connects the components, for example, by means of a bus 270 as a data transfer path.

The MPU 250 is composed of one or more processors configured as operation circuits such as a micro-processing unit (MPU) and various processing circuits and functions as the controller 206 that controls the whole information processing apparatus 200. In addition, the MPU 250 serves as, for example, a decision unit 210 and an operation control unit 212, which will be described later, in the information processing apparatus 200.

The ROM 252 stores data for control, such as programs and operation parameters used by the MPU 250, and the like. The RAM 254 temporarily stores, for example, a program or the like executed by the MPU 250.

The recording medium 256 functions as the storage unit (not shown) and stores, for example, data such as various applications. Here, as the recording medium 256, for example, a magnetic recording medium such as a hard disk and a nonvolatile memory such as a flash memory may be exemplified. Furthermore, the recording medium 256 may be attachable to/detachable from the information processing apparatus 200.

The input/output interface 258 is connected, for example, to the operation input device 260 and the display device 262. The operation input device 260 serves as the operation unit (not shown) and the display device 262 serves as the display unit (not shown). Here, as the input/output interface 258, for example, a USB port, a DVI terminal, an HDMI (trademark) terminal, various processing circuits or the like may be exemplified.

In addition, the operation input device 260 is, for example, included in the information processing apparatus 200 and connected to the input/output interface 258 inside of the information processing apparatus 200. As the operation input device 260, for example, a button, a direction key, a rotary type selector such as a jog dial or a combination thereof may be exemplified.

Furthermore, the display device 262 is, for example, included in the information processing apparatus 200 and connected to the input/output interface 258 inside of the information processing apparatus 200. As the display device 262, for example, a liquid crystal display, an organic EL display or the like may be exemplified.

Of course, the input/output interface 258 may be connected to an external device such as an external operation input device (e.g., a keyboard, a mouse, etc.) and an external display device as external devices of the information processing apparatus 200. Furthermore, the display device 262 may be, for example, a device that enables display and a user operation, such as a touch screen.

The communication interface 264 is a communication means included in the information processing apparatus 200 and serves as the communication unit 202 for performing wireless or wired communication with an external device such as a target apparatus via a network (or directly). Here, as the communication interface 264, for example, a communication antenna and an RF circuit (wireless communication), an IEEE 802.15.1 port and a transmission/reception circuit (wireless communication), an IEEE 802.11 port and a transmission/reception circuit (wireless communication), a local area network (LAN) terminal and a transmission/reception circuit (wired communication) or the like may be exemplified.

The carrier transmission circuit 266 and the antenna circuit 268 are other communication means included in the information processing apparatus 200 in order to perform communication with an IC tag according to NFC, for example. The carrier transmission circuit 266 and the antenna circuit 268 serve as an acquisition unit (which will be described below) for acquiring tag information from an IC tag through communication with the IC tag. In addition, the carrier transmission circuit 266 and the antenna circuit 268 may update data stored in the IC tag through communication with the IC tag. The carrier transmission circuit 266 and the antenna circuit 268 function as a reader/writer in NFC.

The antenna circuit 268 is composed of, for example, a resonant circuit including a coil having a predetermined inductance as a transmission/reception antenna and a capacitor having a predetermined capacitance, and a demodulation circuit. In addition, the antenna circuit 268 demodulates data transmitted from the IC tag according to load modulation by receiving, for example, a magnetic field (carrier) of 13.56 [MHz].

The carrier transmission circuit 266 includes, for example, a modulation circuit for performing modulation such as amplitude shift keying (ASK) and an amplification circuit for amplifying the output of the modulation circuit and transmits a carrier carrying a carrier signal from the transmission/reception antenna of the antenna circuit 268. By including the carrier transmission circuit 266, the information processing apparatus 100 functions as an initiator in NFC and serves as a so-called "reader/writer." Here, as the carrier signal transmitted from the antenna circuit 268 by the carrier transmission circuit 266, for example, a signal representing a tag information transmission request and a request for update of data such as tag information may be exemplified. Carrier transmission of the carrier transmission circuit 266 is controlled by the MPU 150, for example.

The information processing apparatus 200 performs the processing of the information processing method according to the present embodiment, for example, according to the configuration illustrated in FIG. 11. The hardware configuration of the information processing apparatus 200 according to the second embodiment is not limited to the configuration illustrated in FIG. 11.

For example, the information processing apparatus 200 may not include the communication interface 264 when the information processing apparatus 200 performs communication with an external device via an external communication device connected thereto.

The information processing apparatus 200 may not include the carrier transmission circuit 266 and the antenna circuit 268 when the information processing apparatus 200 communicates with the IC tag, for example, via an external carrier transmission circuit and antenna circuit connected thereto.

Furthermore, the information processing apparatus 200 may include an arbitrary communication device that may communicate with a tag according to the present embodiment, such as a circuit with respect to infrared communication, instead of the carrier transmission circuit 266 and the antenna circuit 268 which perform communication according to NFC.

The information processing apparatus 200 may have, for example, a configuration that does not include the recording medium 256, the operation input device 260 and the display device 262.

An example of the configuration of the information processing apparatus 200 will be described with reference to FIG. 10.

The communication unit 202 is a communication means included in the information processing apparatus 200 and performs wireless or wired communication with an external device such as a target apparatus via a network (or directly). Communication of the communication unit 202 is controlled by the controller 206.

Here, while a communication antenna and an RF circuit, a LAN terminal and a transmission/reception circuit or the like may be exemplified as the communication unit 202, for example, the configuration of the communication unit 202 is not limited thereto. For example, the communication unit 202 may have a configuration corresponding to an arbitrary standard that enables communication of a USB port, a transmission/reception circuit and the like, and an arbitrary configuration in which communication with an external device via a network may be performed. In addition, the communication unit 202 may have a configuration in which communication with one or more external devices according to a plurality of communication schemes may be performed.

The acquisition unit 204 communicates with the IC tag to acquire tag information from the IC tag. Acquisition of tag information by the acquisition unit 204 is controlled, for example, by the controller 206 (more specifically, the decision unit 210 that performs the process of (I) (decision process)).

Furthermore, in the information processing apparatus 200, data stored in the IC tag, such as tag information, may be updated according to communication with the IC tag through the acquisition unit 204, for example. Update of data stored in the IC tag is accomplished when the controller 206 controls the acquisition unit 204 to transmit a signal representing a data update request to the IC tag.

As the acquisition unit 204, for example, the carrier transmission circuit 266 and the antenna circuit 268 illustrated in FIG. 11 may be exemplified.

The controller 206 is configured with an MPU, for example, and controls the whole information processing apparatus 200. In addition, the controller 206 includes, for example, the decision unit 210 and the operation control unit 212 and actively performs the processing of the information processing method according to the present embodiment.

The decision unit 210 actively performs the process of (I) (decision process) to decide an operation mode of a target apparatus on the basis of tag information acquired from the IC tag. For example, the decision unit 210 allows the acquisition unit 204 to transmit a tag information transmission request and decides the operation mode of the target apparatus on the basis of tag information acquired by the acquisition unit 204 from the IC tag.

The operation control unit 212 actively performs the process of (II) (operation control process) and allows the target apparatus to perform a process corresponding to the operation mode decided by the decision unit 210. The operation control unit 212 allows communication with the target apparatus to be performed on the basis of information about communication, which is included in the tag information, and transmits an operation request for performing the process corresponding to the operation mode decided by the decision unit 210 to the target apparatus through communication with the target apparatus.

The controller 206 actively performs the processing of the information processing method according to the present embodiment by including the decision unit 210 and the operation control unit 212, for example.

The information processing apparatus 200 performs the processing of the information processing method according to the present embodiment (e.g., the process of (I) (decision process) and the process of (II) (operation control process)) according to, for example, the configuration illustrated in FIG. 10.

Accordingly, the information processing apparatus 200 may improve user convenience according to, for example, the configuration illustrated in FIG. 10.

In addition, the information processing apparatus 200 may achieve the effect obtained by performing the processing of the information processing method according to the present embodiment, as described above, for example, according to the configuration illustrated in FIG. 10.

The configuration of the information processing apparatus according to the second embodiment is not limited to the configuration illustrated in FIG. 10.

For example, the information processing apparatus according to the second embodiment may have a configuration that does not include the operation control unit 212 illustrated in FIG. 10.

Even when the information processing apparatus according to the second embodiment has a configuration that does not include the operation control unit 212, the information processing apparatus according to the second embodiment may decides an operation mode of the target apparatus on the basis of the tag information acquired from the IC tag according to the process of (I) (decision process). Accordingly, the information processing apparatus according to the second embodiment may improve user convenience even when the information processing apparatus according to the second embodiment has a configuration that does not include the operation control unit 112

When the information processing apparatus has a configuration that does not include the operation control unit 212, the process of (II) (operation control process) is performed and the process corresponding to the decided operation mode is controlled by, for example, an external device of the information processing apparatus according to the second embodiment, and thus an operation in the operation mode decided in the information processing apparatus according to the second embodiment is realized in the target apparatus.

Furthermore, the information processing apparatus according to the second embodiment may include one or both of the decision unit 210 and the operation control unit 212 illustrated in FIG. 10 separately from the controller 206 (e.g., implemented as a separate processing circuit).

As described above, the process of (I) (decision process) and the process of (II) (operation control process) are divisions of the processing of the information processing method according to the present embodiment for convenience. Accordingly, the configuration for implementing the processing of the information processing method according to the present embodiment is not limited to the decision unit 210 and the operation control unit 212 illustrated in FIG. 10 and may be a configuration according to division of the processing of the information processing method according to the present embodiment.

When communication with an external device via an external communication device having the same function and configuration as the communication unit 202, for example, is performed, the information processing apparatus according to the second embodiment may not include the communication unit 202.

For example, when communication with the IC tag is performed via an external communication device having the same function and configuration as the acquisition unit 204 to acquire tag information, the information processing apparatus according to the second embodiment may not include the acquisition unit 204.

Moreover, the information processing apparatus according to the second embodiment may further include, for example, a notification unit (not shown) for notifying the user of a decided operation mode. The notification unit (not shown) visually and/or aurally notifies the user of the decided operation mode. For example, the notification unit (not shown) visually notifies the user of the decided operation mode through "a character and a figure, light or a combination thereof," "switching to a user interface (UI) corresponding to the operation mode" or the like and aurally notifies the user of the decided operation mode using a sound (including music). Notification of the decided operation mode according to the notification unit (not shown) is controlled by the controller 206, for example.

As the notification unit (not shown), for example, the display device 262 illustrated in FIG. 6, a DSP, a speaker and the like may be exemplified.

When the information processing apparatus according to the second embodiment includes the notification unit (not shown), the user who has performed a touch operation may recognize the decided operation mode and thus more easily recognize the operation mode of the target apparatus.

While the information processing apparatus has been described as the second embodiment, the second embodiment is not limited thereto. For example, the second embodiment may be applied to various apparatuses, such as communication devices such as a smart phone or a cellular phone, as illustrated in FIG. 2, tablet type devices, computers such as a PC, video/music players (or video/music recording/replay device) and game machines. In addition, the present embodiment may be applied to, for example, a processing IC that may be integrated into the aforementioned devices.

(Program According to Present Embodiment)

[I] Program for Functioning as Information Processing Apparatus According to First Embodiment A program (for example, a program capable of executing processing of the information processing method according to the present embodiment, such as "the process of (1) (decision process)" or "the process of (1) (decision process) and the process of (2) (execution process)") for enabling a computer to function as the information processing apparatus according to the first embodiment may be executed by a processor in the computer, thereby improving user convenience.

In addition, a program for enabling a computer to function as the information processing apparatus according to the first embodiment may be executed by a processor in the computer to achieve the effects obtained by processing of the aforementioned information processing method according to the present embodiment.

[II] Program for Functioning as Information Processing Apparatus According to Second Embodiment A program (for example, a program capable of executing the processes of the information processing method according to the present embodiment, such as "the process of (I) (decision process)" or "the process of (I) (decision process) and the process of (II) (operation control process)") for enabling a computer to function as the information processing apparatus according to the second embodiment may be executed by a processor in the computer, thereby improving user convenience.

In addition, a program for enabling a computer to function as the information processing apparatus according to the second embodiment may be executed by a processor in the computer to achieve the effects obtained by processing of the aforementioned information processing method according to the present embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while the programs (computer programs) for enabling a computer to function as the information processing apparatus according to the first embodiment and the information processing apparatus according to the second embodiment are provided in the above description, the present embodiment may provide recording media storing the programs separately or a recording medium storing the programs together.

The aforementioned configuration represents an example of the present embodiment and, of course, belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing apparatus including:

a decision unit configured to decide an operation mode defining an operation of a target apparatus on the basis of tag information acquired from a tag capable of communicating with an external device, the target apparatus being an apparatus corresponding to the tag information.

(2)

The information processing apparatus according to (1), wherein the tag information includes information about the operation mode, and the decision unit decides the operation mode corresponding to the information about the operation mode.

(3)

The information processing apparatus according to (2), wherein the information about the operation mode is information representing the operation mode, and the decision unit decides the operation mode indicated by the information representing the operation mode as the operation mode of the target apparatus.

(4)

The information processing apparatus according to (2), wherein the information about the operation mode is preset information representing predetermined settings, and the decision unit decides a preset mode in which the settings represented by the preset information are set as the operation mode.

(5)

The information processing apparatus according to any one of (1) to (4), wherein the decision unit decides the operation mode whenever the tag information is acquired.

(6)

The information processing apparatus according to any one of (1) to (5), further including:

an operation control unit configured to control the target apparatus to perform a process corresponding to the decided operation mode.

(7)

The information processing apparatus according to (6), wherein the tag information includes information about communication with the target apparatus, and the operation control unit communicates with the target apparatus on the basis of the information about the communication and transmits an operation request for performing the process corresponding to the decided operation mode to the target apparatus through communication with the target apparatus.

(8)

The information processing apparatus according to any one of (1) to (7), further including:

an acquisition unit configured to acquire the tag information from the tag, wherein the decision unit decides the operation mode on the basis of the tag information acquired by the acquisition unit.

(9)

An information processing apparatus including:

a plurality of tags capable of communicating with an external device; and a decision unit configured to decide an operation mode defining an operation on the basis of communication of the tags.

(10)

The information processing apparatus according to (9), wherein the decision unit decides the operation mode on the basis of tag information acquired from a tag performing communication.

(11)

The information processing apparatus according to (9), wherein the decision unit decides the operation mode previously correlated with the tag performing communication as the operation mode.

(12)

The information processing apparatus according to any one of (9) to (11), wherein the decision unit decides the operation mode indicated by an operation request transmitted from the external device on the basis of the tag information acquired from the tag as the operation mode.

(13)

The information processing apparatus according to (12), wherein the decision unit determines the external device transmitting the operation request and decides the operation mode for the determined external device.

(14)

The information processing apparatus according to any one of (9) to (13), wherein the decision unit decides the operation mode whenever any of a plurality of the tags performs communication.

(15)

The information processing apparatus according to any one of (9) to (14), further including:

a processing unit configured to perform a process corresponding to the decided operation mode.

(16)

An information processing method performed by an information processing apparatus, the method including:

deciding an operation mode defining an operation of a target apparatus on the basis of tag information acquired from a tag capable of communicating with an external device, the target apparatus being an apparatus corresponding to the tag information.

(17)

An information processing method performed by an information processing apparatus including a plurality of tags, the method including:

deciding an operation mode defining an operation on the basis of communication of a tag capable of communicating with an external device.

(18)

A program for enabling a computer to execute deciding an operation mode defining an operation of a target apparatus on the basis of tag information acquired from a tag capable of communicating with an external device, the target apparatus being an apparatus corresponding to the tag information.

(19)

A program for enabling a computer including a plurality of tags to execute deciding an operation mode defining an operation on the basis of communication of a tag capable of communicating with an external device.

REFERENCE SIGNS LIST 100, 200 Information processing apparatus
102A, 102B IC tag
104, 202 Communication unit
106 Photographing unit
108, 206 Controller
110, 210 Decision unit
112 Processing unit
204 Acquisition unit
212 Operation control unit

The invention claimed is:

1. An information processing apparatus, comprising:
a plurality of tags configured to communicate with an external device;
an acquisition unit configured to acquire, from a first tag of the plurality of tags, first tag information; and
a decision unit configured to determine an operation mode, that defines an operation of a target apparatus, based on the first tag information,
wherein the target apparatus is an apparatus that corresponds to the first tag information.

2. The information processing apparatus according to claim 1, wherein the first tag information includes information that corresponds to the operation mode.

3. The information processing apparatus according to claim 2, wherein the information corresponding to the operation mode is information that represents the operation mode.

4. The information processing apparatus according to claim 2,
wherein the information corresponding to the operation mode is preset information that represents settings, and
wherein the decision unit is further configured to:
determine a preset mode, as the operation mode, based on the information; and
set the settings based on the preset mode.

5. The information processing apparatus according to claim 1, wherein
the acquisition unit is further configured to acquire, from a second tag of the plurality of tags, second tag information; and
the decision unit is further configured to determine the operation mode based on the second tag information.

6. The information processing apparatus according to claim 1, further comprising: an operation control unit configured to control the target apparatus, to execute a process corresponding to the operation mode of the target apparatus.

7. The information processing apparatus according to claim 6,
wherein the first tag information includes information that corresponds to communication with the target apparatus, and
wherein the operation control unit is further configured to:
communicate with the target apparatus based on the information that corresponds to the communication; and
transmit an operation request to the target apparatus through the communication with the target apparatus to execute the process that corresponds to the operation mode.

8. An information processing apparatus, comprising:
a plurality of tags configured to communicate with an external device; and
a decision unit configured to determine, a first operation mode that defines an operation, based on communication of a first tag of the plurality of tags, with the external device.

9. The information processing apparatus according to claim 8, further comprising:
an acquisition unit configured to acquire tag information from the first tag,
wherein the decision unit is further configured to determine the first operation mode based on the tag information.

10. The information processing apparatus according to claim 8, wherein the decision unit is further configured to determine the latest operation mode that is correlated with the first tag.

11. The information processing apparatus according to claim 9, further comprising:
a communication unit configured to receive, from the external device, an operation request based on the tag information,
wherein the decision unit is further configured to determine the first operation mode based on the operation request.

12. The information processing apparatus according to claim 11, wherein the decision unit is further configured to:
determine the external device that transmits the operation request; and
determine the first operation mode associated with the determined external device.

13. The information processing apparatus according to claim 8, wherein the decision unit is further configured to determine a second operation mode based on communication of a second tag of the plurality of the tags, with the external device.

14. The information processing apparatus according to claim 8, further comprising:
a processing unit configured to execute a process corresponding to the first operation mode.

15. A method comprising:
in an information processing apparatus that includes a tag which is configured to communicate with an external device:
acquiring tag information from the tag; and
determining an operation mode, that defines an operation of a target apparatus, based on the tag information,
wherein the target apparatus is an apparatus corresponding to the tag information.

16. A method, comprising:
in an information processing apparatus that includes a plurality of tags which are configured to communicate with an external device:
determining an operation mode, that defines an operation, based on communication of a tag of the plurality of tags, with the external device.

17. A non-transitory computer-readable medium having stored thereon computer-readable instructions which when executed by an information processing apparatus, cause the information processing apparatus to execute operations, the operations comprising:
communicating with an external device through a tag of the information processing apparatus;
acquiring tag information from the tag; and
determining, based on the tag information, an operation mode that defines an operation of a target apparatus,
wherein the target apparatus is an apparatus corresponding to the tag information.

18. A non-transitory computer-readable medium having stored thereon computer-readable instructions which when executed by an information processing apparatus, cause the information processing apparatus to execute operations, the operations comprising:
 controlling communication of a tag of the information processing apparatus with an external device; and
 determining an operation mode, that defines an operation, based on the communication of the tag with the external device.

* * * * *